(12) United States Patent
Terada et al.

(10) Patent No.: US 9,375,642 B2
(45) Date of Patent: Jun. 28, 2016

(54) NETWORK GAME SYSTEM, CONTROL METHOD OF NETWORK GAME SYSTEM, GAME DEVICE, CONTROL METHOD OF GAME DEVICE, PROGRAM, AND INFORMATION STORAGE MEDIUM

(75) Inventors: Toshiyuki Terada, Chiba (JP); Yoji Takeuchi, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 749 days.

(21) Appl. No.: 12/674,313

(22) PCT Filed: Jun. 24, 2008

(86) PCT No.: PCT/JP2008/061484
§ 371 (c)(1),
(2), (4) Date: Feb. 19, 2010

(87) PCT Pub. No.: WO2009/025124
PCT Pub. Date: Feb. 26, 2009

(65) Prior Publication Data
US 2011/0275439 A1      Nov. 10, 2011

(30) Foreign Application Priority Data

Aug. 23, 2007  (JP) ................. 2007-217670

(51) Int. Cl.
*A63F 13/30* (2014.01)
(52) U.S. Cl.
CPC ........... *A63F 13/12* (2013.01); *A63F 2300/554* (2013.01); *A63F 2300/5586* (2013.01); *A63F 2300/572* (2013.01); *A63F 2300/8011* (2013.01)
(58) Field of Classification Search
CPC .................. A63F 2300/572; A63F 2300/5586

USPC ........................................ 463/29, 24; 700/91
See application file for complete search history.

(56) References Cited

U.S. PATENT DOCUMENTS

| 684,897 A | 10/1901 | Yarbrough |
|---|---|---|
| 6,026,079 A | 2/2000 | Perlman |

(Continued)

FOREIGN PATENT DOCUMENTS

| CN | 1293584 A | 5/2001 |
|---|---|---|
| EP | 1 852 160 A1 | 11/2007 |

(Continued)

OTHER PUBLICATIONS

"Total Annihilation Zone Tournament Rules", Jan. 2005.*

(Continued)

*Primary Examiner* — James S McClellan
*Assistant Examiner* — Syvila Weatherford
(74) *Attorney, Agent, or Firm* — Sughrue Mion, PLLC

(57) ABSTRACT

A network game system is provided which can inhibit a user from disconnecting the power supply or communication connection of the user's game device during a competition for the user's own reasons. A condition storage (70c) stores a plurality of game status conditions related to a game status. A condition judging unit (76) judges whether or not the game status satisfies each of the plurality of game status conditions. A partway-end judging unit (74) judges whether or not the competition has ended partway through the competition. A predetermined process executing unit (78) executes, in a case where the competition has ended partway through the competition, a predetermined process based on a judgment result of whether or not a game status at the time when the competition has ended partway through the competition satisfies each of the plurality of game status conditions.

20 Claims, 15 Drawing Sheets

(56) References Cited

U.S. PATENT DOCUMENTS

| | | | |
|---|---|---|---|
| 6,848,997 B1* | 2/2005 | Hashimoto et al. | 463/42 |
| 7,367,888 B1* | 5/2008 | Chen et al. | 463/42 |
| 2003/0217135 A1 | 11/2003 | Chatani et al. | |
| 2004/0259640 A1 | 12/2004 | Gentles et al. | |
| 2005/0026696 A1* | 2/2005 | Hashimoto et al. | 463/42 |
| 2006/0205509 A1 | 9/2006 | Hirota | |
| 2006/0247038 A1 | 11/2006 | Bamberger et al. | |
| 2007/0276521 A1* | 11/2007 | Harris et al. | 700/91 |
| 2008/0026836 A1 | 1/2008 | Kubota et al. | |
| 2009/0270171 A1 | 10/2009 | Onuki et al. | |

FOREIGN PATENT DOCUMENTS

| | | |
|---|---|---|
| EP | 1 987 865 A1 | 11/2008 |
| JP | 10-042062 A | 2/1998 |
| JP | 2001-187273 A | 7/2001 |
| JP | 2004-000680 A | 1/2004 |
| JP | 2004-154365 A | 6/2004 |
| JP | 2004-222805 A | 8/2004 |
| JP | 2005-137812 A | 6/2005 |
| JP | 2006-223496 A | 8/2006 |
| JP | 2006-288769 A | 10/2006 |
| TW | 200635644 A | 10/2006 |
| WO | 2006/082853 A1 | 8/2006 |
| WO | 2006/087916 A1 | 8/2006 |
| WO | WO 2006109530 A1 * | 10/2006 |
| WO | 2007/058089 A1 | 5/2007 |
| WO | 2007/094215 A1 | 8/2007 |

OTHER PUBLICATIONS

Command and Conquer Generals, English 1.8 Patch (version Dec. 2005).*
International Search Report corresponding to European Patent Application No. 08765816.7 dated Oct. 26, 2010.
Taiwanese Office Action corresponding to Taiwanese Patent Application No. 097127592, dated Aug. 15, 2011.
European Search Report dated Dec. 23, 2011.

* cited by examiner

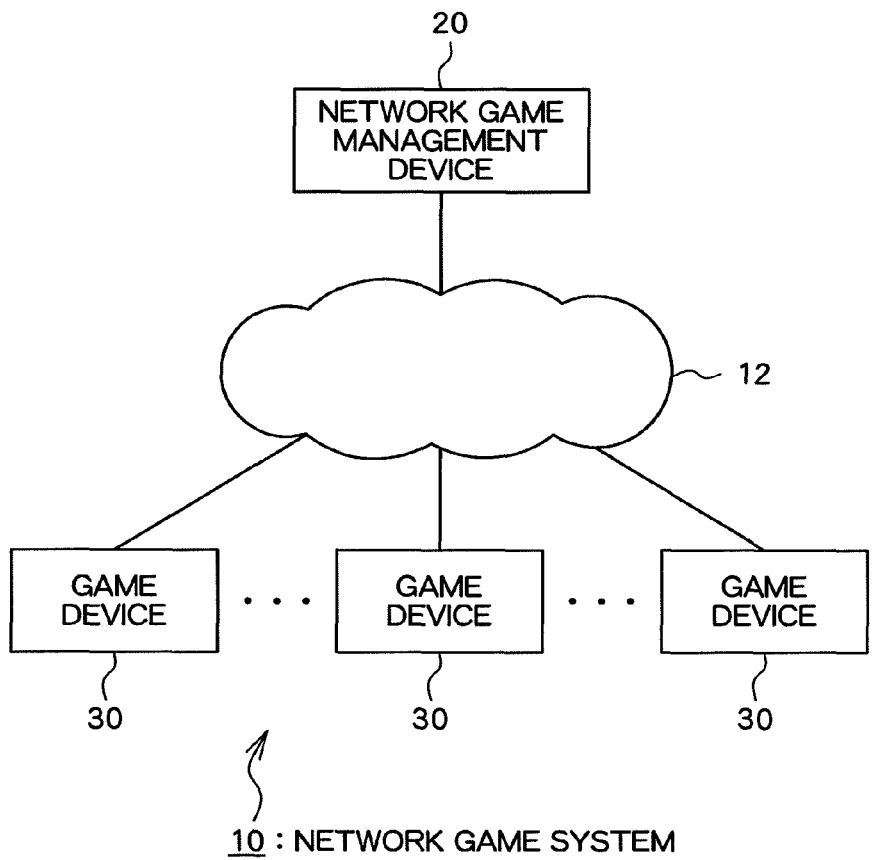
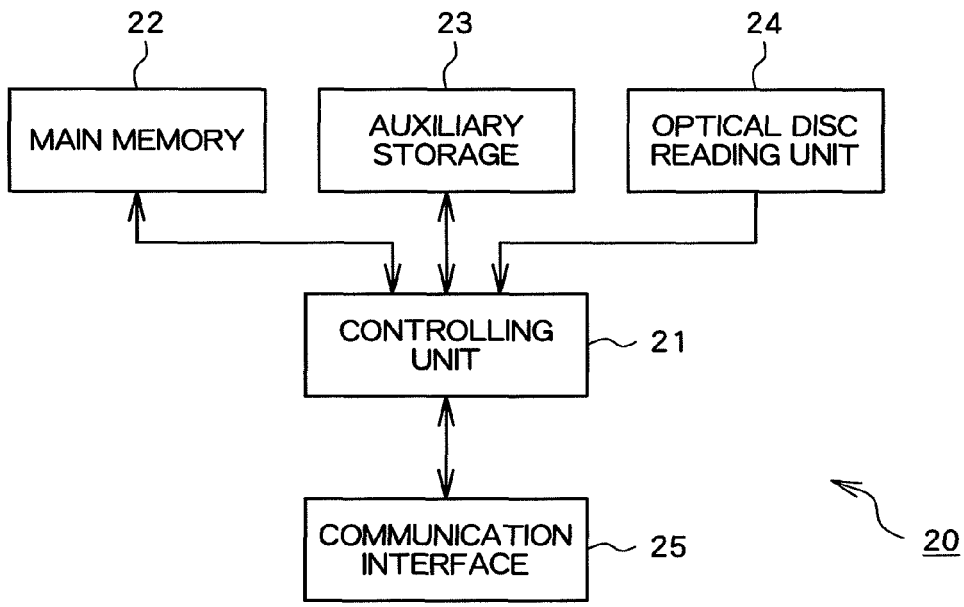

FIG.8

| | |
|---|---|
| MATCH PROGRESS DATA | MATCH TIME DATA |
| | SCORE DATA |
| | FOUL DATA |
| | YELLOW / RED CARD DATA |
| | PLAYER SUBSTITUTION DATA |
| | BALL POSSESSION TIME DATA |
| STATE DATA OF VIRTUAL CAMERA | POSITION DATA |
| | DIRECTION OF LINE OF SIGHT DATA |
| | . . . |
| STATE DATA OF BALL OBJECT | POSITION DATA |
| | MOVEMENT DIRECTION / SPEED DATA |
| | . . . |
| STATE DATA OF PLAYER OBJECT #1 | POSITION DATA |
| | POSTURE DATA |
| | MOVEMENT DIRECTION / SPEED DATA |
| | ACTION TYPE DATA |
| | OPERATION TARGET FLAG |
| | BALL POSSESSION FLAG |
| | . . . |
| STATE DATA OF PLAYER OBJECT #2 | POSITION DATA |
| | . . . |
| . . . | . . . |
| STATE DATA OF PLAYER OBJECT #22 | POSITION DATA |
| | . . . |

| TOTAL COMPETITION RECORD | 60 MATCHES, 30 WINS, 20 LOSSES, 10 TIES |
|---|---|
| TOTAL SCORE | 52 |
| TOTAL CONCEDED SCORE | 40 |
| TOTAL NUMBER OF FOULS | 85 |
| NUMBER OF PARTWAY END | 3 |

FIG.12

| DATE AND TIME | WIN/LOSS | SCORE | CONCEDED SCORE |
|---|---|---|---|
| 2007/07/11 18:05:30 | 1 | 2 | 0 |
| 2007/07/12 19:10:20 | 0 | 0 | 1 |
| 2007/07/13 20:35:56 | 2 | 1 | 1 |
| ... | ... | ... | ... |

FIG.13

| ID | CONDITION | POINT AMOUNT |
|---|---|---|
| 101 | IS TOTAL COMPETITION RECORD OF USER ALL WINS? | $P_{101}$ |
| 102 | IS TOTAL CONCEDED SCORE OF USER 0? | $P_{102}$ |
| 103 | IS TOTAL NUMBER OF FOULS OF USER 0? | $P_{103}$ |
| 104 | ARE 10 MOST RECENT COMPETITION RESULTS OF USER ALL WINS? | $P_{104}$ |
| 105 | IS CONCEDED SCORE OF USER IN 5 MOST RECENT COMPETITION 0? | $P_{105}$ |
| 106 | IS NUMBER OF PARTWAY END OF USER 1 OR GREATER? | $P_{106}$ |
| 107 | IS FREQUENCY OF PARTWAY END OF USER HIGH? | $P_{107}$ |
| 108 | IS COMPETITION OPPONENT TEAM A STRONG TEAM? | $P_{108}$ |
| 109 | IS ABILITY PARAMETER OF COMPETITION OPPONENT TEAM SIGNIFICANTLY GREATER THAN ABILITY PARAMETER OF USER TEAM? | $P_{109}$ |
| 110 | IS CONDITION PARAMETER OF USER TEAM LOW? | $P_{110}$ |

FIG. 14

| ID | CONDITION | POINT AMOUNT |
|---|---|---|
| 201 | IS SCORE OF USER TEAM LESS THAN SCORE OF COMPETITION OPPONENT TEAM? | $P_{201}$ |
| 202 | IS SCORE OF USER TEAM 0? | $P_{202}$ |
| 203 | IS NUMBER OF RED CARDS OF USER TEAM GREATER THAN OR EQUAL TO 1? | $P_{203}$ |
| 204 | IS NUMBER OF YELLOW CARDS OF USER TEAM GREATER THAN OR EQUAL TO 1? | $P_{204}$ |
| 205 | IS REMAINING NUMBER OF PLAYER SUBSTITUTIONS OF USER TEAM 0? | $P_{205}$ |
| 206 | IS REMAINING TIME OF MATCH SHORT? | $P_{206}$ |
| 207 | IS BALL POSSESSION PERCENTAGE OF USER TEAM SIGNIFICANTLY LOWER THAN BALL POSSESSION PERCENTAGE OF COMPETITION OPPONENT TEAM? | $P_{207}$ |
| 208 | IS PLAYER OBJECT OF COMPETITION OPPONENT TEAM IN POSSESSION OF BALL OBJECT IN PENALTY AREA OF USER TEAM? | $P_{208}$ |
| 209 | IS PLAYER OBJECT OF COMPETITION OPPONENT TEAM IN POSSESSION OF BALL OBJECT IN AREA IN WHICH CROSS PASS IS POSSIBLE? | $P_{209}$ |
| 210 | IS NUMBER OF PLAYER OBJECTS OF USER TEAM POSITIONED BETWEEN PLAYER OBJECT OF COMPETITION OPPONENT TEAM IN POSSESSION OF BALL OBJECT AND GOAL OBJECT OF USER TEAM LESS THAN OR EQUAL TO 1? | $P_{210}$ |
| 211 | IS IT IMMEDIATELY AFTER FREE KICK IN FRONT OF GOAL OBJECT OF USER TEAM IS AWARDED TO COMPETITION OPPONENT TEAM? | $P_{211}$ |
| 212 | IS IT IMMEDIATELY AFTER PENALTY KICK IS AWARDED TO COMPETITION OPPONENT TEAM? | $P_{212}$ |
| 213 | IS IT IMMEDIATELY AFTER COMPETITION OPPONENT TEAM SCORED? | $P_{213}$ |
| 214 | IS IT IMMEDIATELY AFTER COMPETITION OPPONENT TEAM SCORED GO-AHEAD GOAL? | $P_{214}$ |
| 215 | IS IT IMMEDIATELY AFTER PLAYER OBJECT OF USER TEAM MISSED KICK? | $P_{215}$ |
| 216 | IS IT CURRENTLY INJURY TIME? | $P_{216}$ |
| 217 | IS IT CURRENTLY PENALTY SHOOT-OUT? | $P_{217}$ |

FIG.19

| COMPETITION START/COMPLETION FLAG | 1 |
|---|---|
| INTENTIONAL DISCONNECTION FLAG | 1 |
| TIME LIMIT FOR COMPETITION RESTRICTION | 2007/7/29 |

FIG.20

| ID | JUDGMENT RESULT FLAG |
|---|---|
| 101 | 1 |
| 102 | 0 |
| ... | ... |
| 110 | 1 |
| 111 | 1 |
| 201 | 0 |
| 202 | 1 |
| ... | ... |
| 216 | 0 |
| 217 | 0 |

NETWORK GAME SYSTEM, CONTROL METHOD OF NETWORK GAME SYSTEM, GAME DEVICE, CONTROL METHOD OF GAME DEVICE, PROGRAM, AND INFORMATION STORAGE MEDIUM

TECHNICAL FIELD

The present invention relates to a network game system, a control method of network game system, a game device, a control method of game device, a program, and an information storage medium.

BACKGROUND ART

A network game system, which executes a network game in which a plurality of users participate through a communication network, is known. For example, network game systems, in which a plurality of users compete in a soccer game or a mah-jong game through a communication network, are known.
[Patent Document 1] JP 2005-137812 A

DISCLOSURE OF THE INVENTION

Problems to be Solved by the Invention

In the above-described network game system, a user may sometimes end the competition partway through the competition by disconnecting the power supply or communication connection of the user's game device during the competition, for the user's own reasons. For example, a user who is about to lose in the competition may intentionally disconnect the power supply or communication connection of the user's game device during competition, to end the competition in the middle. With such user behavior, the interest of the network game may be lost.

The present invention was conceived in view of the above-described circumstances, and an advantage of the present invention is that a network game system, a control method of a network game system, a game device, a control method of a game device, a program, and an information storage medium are provided which can inhibit the user from disconnecting the power supply or communication connection of the user's game device during competition for the user's own reasons.

Means for Solving the Problems

In order to solve at least the problem described above, according to one aspect of the present invention, there is provided a network game system which executes a network game in which a plurality of users compete through a communication network, the network game system comprising game status data storage means for storing game status data which indicates a game status of the network game, condition storage means for storing a plurality of game status conditions related to the game status, condition judging means for judging, based on the game status data stored in the game status data storage means, whether or not the game status satisfies each of the plurality of game status conditions stored in the condition storage means, partway-end judging means for judging whether or not the competition has ended partway through the competition, and predetermined process executing means for executing, in a case where the competition has ended partway through the competition, a predetermined process based on a judgment result of whether or not the game status at the time when the competition has ended partway through the competition satisfies each of the plurality of game status conditions stored in the condition storage means.

According to another aspect of the present invention, there is provided a method of controlling a network game system which executes a network game in which a plurality of users compete through a communication network, the method comprising a step in which stored content of game status data storage means for storing game status data which indicates a game status of the network game is read, a step in which stored content of condition storage means for storing a plurality of game status conditions related to the game status is read, a condition judging step in which it is judged, based on the game status data stored in the game status data storage means, whether or not the game status satisfies each of the plurality of game status conditions stored in the condition storage means, a partway-end judging step in which it is judged whether or not the competition has ended partway through the competition, and a predetermined process executing step in which a predetermined process is executed, in a case where the competition has ended partway through the competition, based on a judgment result of whether or not the game status at the time when the competition has ended partway through the competition satisfies each of the plurality of game status conditions stored in the condition storage means.

According to another aspect of the present invention, there is provided a program for causing a computer to function as a network game system which executes a network game in which a plurality of users compete through a communication network, and the program further causing the computer to function as means for reading stored content of game status data storage means for storing game status data which indicates a game status of the network game, means for reading stored content of condition storage means for storing a plurality of game status conditions related to the game status, condition judging means for judging, based on the game status data stored in the game status data storage means, whether or not the game status satisfies each of the plurality of game status conditions stored in the condition storage means, partway-end judging means for judging whether or not the competition has ended partway through the competition, and predetermined process executing means for executing, in a case where the competition has ended partway through the competition, a predetermined process based on a judgment result of whether or not the game status at the time when the competition has ended partway through the competition satisfies each of the plurality of game status conditions stored in the condition storage means.

According to another aspect of the present invention, there is provided a game device which is included as one of a plurality of game devices in a "network game system which includes a plurality of game devices and which executes a network game in which users of the plurality of game devices compete through a communication network", the game device comprising game status data storage means for storing game status data which indicates a game status of the network game, condition storage means for storing a plurality of game status conditions related to the game status, condition judging means for judging, based on the game status data stored in the game status data storage means, whether or not the game status satisfies each of the plurality of game status conditions stored in the condition storage means, partway-end judging means for judging whether or not the competition has ended partway through the competition, and predetermined process executing means for executing, in a case where the competition has ended partway through the competition, a predetermined process based on a judgment result of whether or not the game status at the time when the competition has ended partway through the competition satisfies each of the plurality of game status conditions stored in the condition storage means.

According to another aspect of the present invention, there is provided a method of controlling a game device which is included as one of a plurality of game devices in a "network game system which includes a plurality of game devices and which executes a network game in which users of the plurality of game devices compete through a communication network", the method comprising a step in which stored content of game status data storage means for storing game status data which indicates a game status of the network game is read, a step in which stored content of condition storage means for storing a plurality of game status conditions related to the game status is read, a condition judging step in which it is judged, based on the game status data stored in the game status data storage means, whether or not the game status satisfies each of the plurality of game status conditions stored in the condition storage means, a partway-end judging step in which it is judged whether or not the competition has ended partway through the competition, and a predetermined process executing step in which a predetermined process is executed, in a case where the competition has ended partway through the competition, based on a judgment result of whether or not the game status at the time when the competition has ended partway through the competition satisfies each of the plurality of game status conditions stored in the condition storage means.

According to another aspect of the present invention, there is provided a program for causing a computer such as a consumer game device, a portable game device, a portable phone, a personal digital assistant (PDA), and a personal computer to function as a game device included as one of a plurality of game devices in "a network game system which includes a plurality of game devices and which executes a network game in which users of the plurality of game devices compete through a communication network", and the program for causing the computer to function as means for reading stored content of game status data storage means for storing game status data which indicates a game status of the network game, means for reading stored content of condition storage means for storing a plurality of game status conditions related to the game status, condition judging means for judging, based on the game status data stored in the game status data storage means, whether or not the game status satisfies each of the plurality of game status conditions stored in the condition storage means, partway-end judging means for judging whether or not the competition has ended partway through the competition, and predetermined process executing means for executing, in a case where the competition has ended partway through the competition, a predetermined process based on a judgment result of whether or not the game status at the time when the competition has ended partway through the competition satisfies each of the plurality of game status conditions stored in the condition storage means.

According to another aspect of the present invention, there is provided a computer-readable information storage medium which stores the above program. According to another aspect of the present invention, there is provided a program distribution device which comprises an information storage medium which stores the above program, which reads the above program from the information storage medium, and which distributes the above program. According to another aspect of the present invention, there is provided a program distributing method in which the above program is read from an information storage medium which stores the above program and distributed.

The present invention relates to a network game system which executes a network game in which a plurality of users compete through a communication network. In the present invention, game status data which indicates a game status of the network game is stored. In addition, a plurality of game status conditions related to the game status are stored. Based on the game status data, it is judged whether or not the game status satisfies each of the plurality of game status conditions. Moreover, in the present invention, it is judged whether or not the competition has ended partway through the competition. In a case where the competition has ended partway through the competition, a predetermined process is executed based on a judgment result of whether or not the game status at the time when the competition has ended partway through the competition satisfies each of the plurality of game status conditions. According to the present invention, it is possible to inhibit the user from disconnecting the power supply and communication connection of the user's game device during the competition for the user's own reasons.

According to another aspect of the present invention, the network game system may comprise numerical value acquiring means for acquiring a numerical value corresponding to the judgment result by the condition judging means, and comparing means for comparing, with a predetermined reference value, the numerical value corresponding to the judgment result of whether or not the game status at the time when the competition has ended partway through the competition satisfies each of the plurality of game status conditions stored in the condition storage means. The predetermined process executing means may execute the predetermined process based on a comparison result by the comparing means in the case where the competition has ended partway through the competition.

According to another aspect of the present invention, the network game system may comprise base numerical value storage means for storing a base numerical value in correspondence with each of the plurality of game status conditions stored in the condition storage means. The numerical value acquiring means may acquire the numerical value by executing a predetermined calculation process based on the base numerical value stored in correspondence with the game status condition satisfied by the game status among the plurality of game status conditions stored in the condition storage means.

According to another aspect of the present invention, the condition judging means may judge, in a case where the game status data stored in the game status data storage means is updated, whether or not the game status indicated by the game status data satisfies each of the plurality of game status conditions stored in the condition storage means. The numerical value acquiring means may acquire, in a case where the judgment by the condition judgment means is executed, the numerical value corresponding to the judgment result. The comparing means may compare, in a case where the numerical value acquiring means acquires the numerical value, the numerical value with the predetermined reference value, and store the comparison result in non-volatile storage means. The predetermined process executing means may execute the predetermined process based on the comparison result stored in the non-volatile storage means in the case where the competition has ended partway through the competition.

According to another aspect of the present invention, the condition judging means may judge, in a case where the game status data stored in the game status data storage means is updated, whether or not the game status indicated by the game status data satisfies each of the plurality of game status conditions stored in the condition storage means. The numerical value acquiring means may acquire, in a case where the judgment by the condition judging means is executed, the numerical value corresponding to the judgment result, and store the numerical value in non-volatile storage means. The comparing means may compare, in the case where the competition has ended partway through the competition, the numerical value stored in the non-volatile storage means with the predetermined reference value.

According to another aspect of the present invention, the condition judging means may judge, in a case where the game status data stored in the game status data storage means is updated, whether or not the game status indicated by the game status data satisfies each of the plurality of game status conditions stored in the condition storage means, and store the judgment result in non-volatile storage means. The numerical value acquiring means may acquire, in the case where the competition has ended partway through the competition, the numerical value corresponding to the judgment result stored in the non-volatile storage means.

According to another aspect of the present invention, the game status data storage means may be non-volatile storage means. The condition judging means may judge, in the case where the competition has ended partway through the competition, whether or not the game status indicated by the game status data stored in the game status data storage means satisfies each of the plurality of game status conditions stored in the condition storage means.

According to another aspect of the present invention, the predetermined process may include at least one of a process to output a predetermined message to at least one of the plurality of users, and a process to restrict competition by at least one of the plurality of users.

According to another aspect of the present invention, the network game system may comprise total competition record storage means for storing a total competition record of each of the plurality of users. The predetermined process may include a process to update the total competition record of at least one of the plurality of users.

BRIEF DESCRIPTION OF THE DRAWINGS

FIG. 1 is a diagram showing an overall structure of a network game system according to an embodiment of the present invention.

FIG. 2 is a diagram showing a hardware structure of a network game management device.

FIG. 8 is a diagram showing an example of game status data.

FIG. 12 is a diagram showing an example of competition history data.

FIG. 13 is a diagram showing an example of condition data.

FIG. 14 is a diagram showing an example of condition data.

FIG. 19 is a diagram showing an example of data stored in a game card.

FIG. 20 is a diagram showing an example of judgment result data.

BEST MODE FOR CARRYING OUT THE INVENTION

Figure 3:
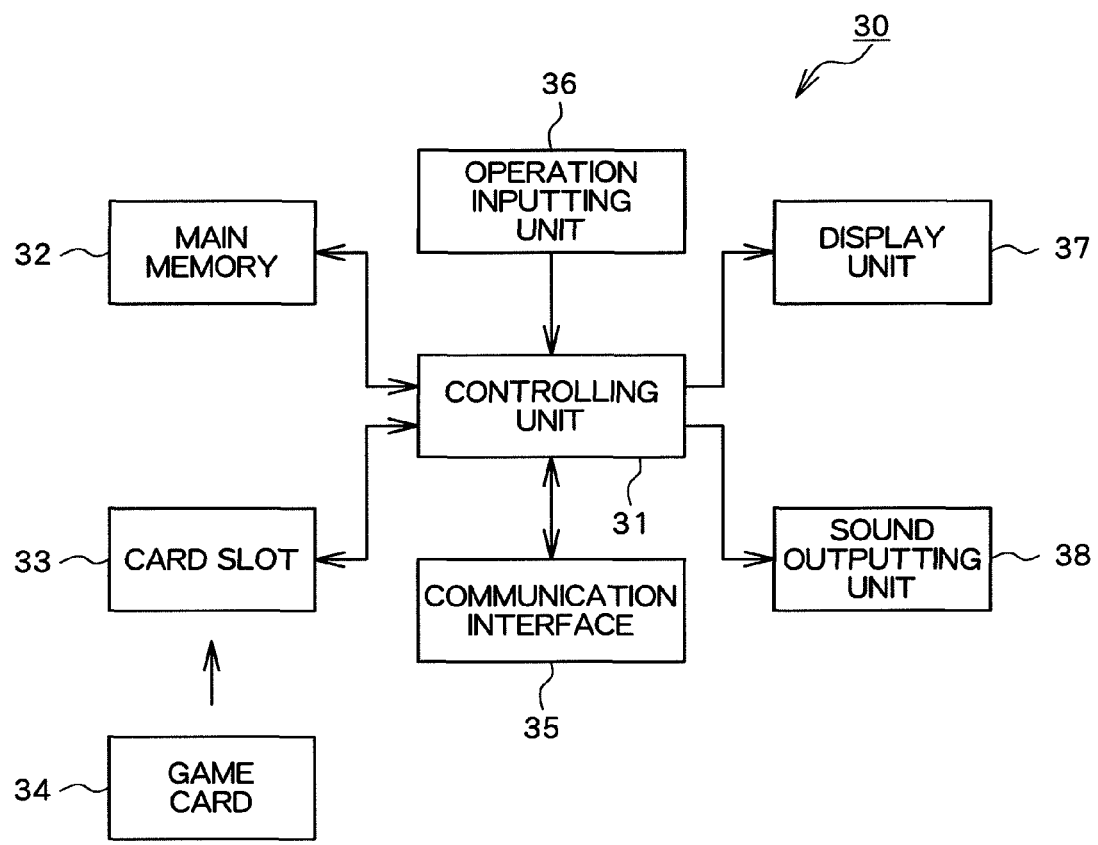
FIG. 3 is a diagram showing a hardware structure of a game device.

An embodiment of the present invention will now be described in detail with reference to the drawings.

FIG. 1 is a diagram showing an overall structure of a network game system according to the embodiment of the present invention. As shown in FIG. 1, a network game system 10 comprises a network game management device 20 and a plurality of game devices 30. The network game management device 20 and the plurality of game devices 30 are connected to a communication network 12. Because of this structure, data can be mutually exchanged between the network game management device 20 and the game devices 30. In addition, data can also be mutually exchanged between the game device 30 and other game devices 30. The communication network 12 comprises, for example, the Internet.

The network game management device 20 is realized with a well-known server computer system. FIG. 2 is a diagram showing a hardware structure of the network game management device 20. As shown in FIG. 2, the network game management device 20 comprises a controlling unit 21, a main memory 22, an auxiliary storage 23, an optical disc reading unit 24, and a communication interface 25.

The controlling unit 21 is, for example, a microprocessor, and executes various information processes according to an operating system and other programs which are read into the main memory 22. The main memory 22 comprises, for example, a RAM. The main memory 22 stores a program and data which are read from the auxiliary storage 23 or an optical disc (information storage medium). The main memory 22 is also used as a work memory for storing various data necessary during the process. The auxiliary storage 23 comprises, for example, a non-volatile storage medium such as a hard disk drive. The optical disc reading unit 24 reads the program and data stored on an optical disc. The optical disc is, for example, a DVD (Registered Trademark)-ROM, CD-ROM, or the like. The communication interface 25 is an interface for connecting the network game management device 20 to the communication network 12.

The game device 30 is realized with, for example, a portable game device, a consumer game device, a portable phone, a personal digital assistant (PDA), or a personal computer. Here, an example configuration is described in which the game device 30 is realized with a portable game device. FIG. 3 is a diagram showing a hardware structure of the game device 30. As shown in FIG. 3, the game device 30 comprises a controlling unit 31, a main memory 32, a card slot 33, a game card 34, a communication interface 35, an operation inputting unit 36, a display unit 37, and a sound outputting unit 38.

The controlling unit 31 is, for example, a microprocessor, and executes various information processes according to an operating system and other programs which are read into the main memory 32. The main memory 32 comprises, for example, a RAM. The main memory 32 stores a program and data which are read from the game card 34 (information storage medium). The main memory 32 is also used as a work memory for storing various data necessary during the process. The card slot 33 reads the program and data stored in the game card 34. The game card 34 comprises, for example, a ROM storing game program and game data and an EEPROM (non-volatile storage) for storing save data or the like. The communication interface 35 is an interface for connecting the game device 30 to the communication network 12. The game device 30 may include an auxiliary storage unit (non-volatile storage) such as, for example, a hard disk drive.

The operation inputting unit 36 is a unit for allowing a user to input an operation. The operation inputting unit 36 is, for example, an operation button, a touch panel, etc. The display unit 37 displays a screen according to an instruction of the controlling unit 31. The display unit 37 is, for example, a liquid crystal display panel. The sound outputting unit 38 outputs various sound data such as a game music, a game sound effect, and a message which are read from the game card 34, according to an instruction of the controlling unit 31. The sound outputting unit 38 is, for example, a speaker or a head phone.

Alternatively, the network game management device 20 may include a memory card slot. With such a structure, the program and data may be supplied through a memory card to the network game management device 20. Alternatively, the game device 30 may include an optical disc reading unit. With such a structure, the program and data may be supplied through the optical disc to the game device 30. Alternatively, the program and data may be supplied from a remote location through the communication network 12 to the network game management device 20 or the game device 30.

In the network game system 10 having the above-described structure, the user can enjoy a game through the communication network 12 with other users in remote locations. For example, the user can enjoy a competitive soccer game through the communication network 12 with another user at a remote location (hereinafter referred to as "competition opponent").

Figure 4:
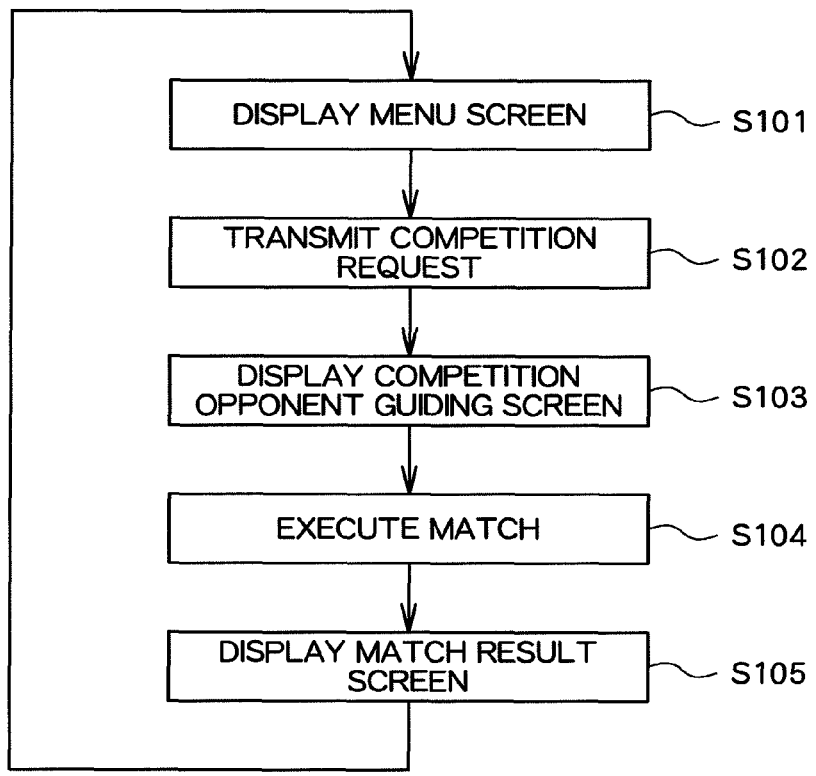
FIG. 4 is a diagram showing a flow of a competitive soccer game.
Figure 5:
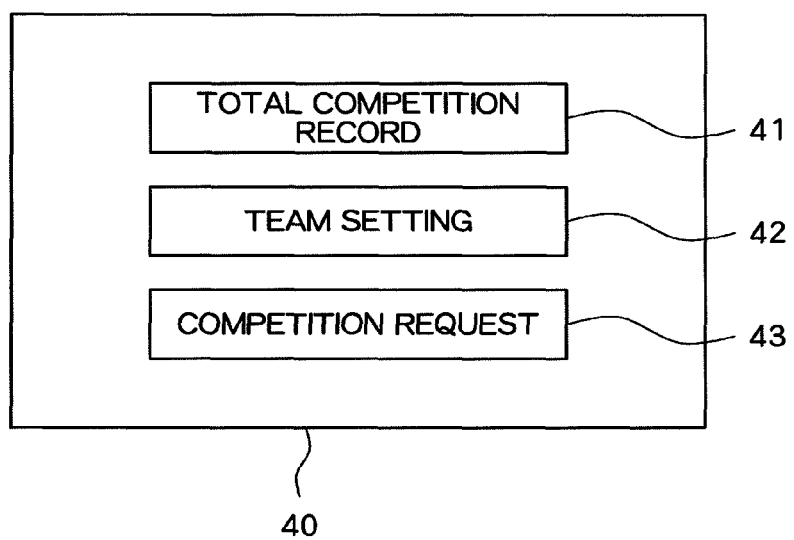
FIG. 5 is a diagram showing an example of a menu screen.

FIG. 4 shows a flow of a competitive soccer game. First, a user accesses the network game management device 20 from the game device 30, and logs in the network game system 10. When the log-in to the network game system 10 is completed, first, a menu screen is displayed (S101). FIG. 5 shows an example of a menu screen. A menu screen 40 shown in FIG. 5 comprises a total competition record button 41, a team setting button 42, and a competition request button 43. When the user instructs the total competition record button 41, a total competition record screen indicating the past competition record of the user is displayed. The past competition record of the user is stored in the game card 34 (refer to FIGS. 11 and 12 to be described later).

The team setting button 42 is a button for displaying a team setting screen for allowing a user to create team data of the user. The user must create the user's team data in advance, prior to the competition. When the user instructs the team setting button 42, a team setting screen is displayed. In the team setting screen, the user selects a desired team from among a plurality of teams which are prepared in advance. The user sets starter players, a formation, etc. of the team. The team data thus created by the user is stored in the game card 34.

A user who desires a competition operates the competition request button 43. When the competition request button 43 is operated, competition request data is transmitted to the network game management device 20 (S102). In this process, the user data which is stored in the game card 34 in advance is read and is transmitted to the network game management device 20 along with the competition request data. The "user data" include, for example, a name of the user, an IP address of the game device 30 of the user, team data of the user, etc. When the network game management device 20 receives the user data along with the competition request data from the game device 30, the network game management device 20 stores the user data in the auxiliary storage 23.

The network game management device 20 receiving the competition request data automatically determines a competition opponent from among the other users requesting a competition. For example, in a case where a user B is determined as a competition opponent of a user A, the network game management device 20 reads the data of the user B (such as the user name, IP address, team data, or the like) from the auxiliary storage 23 and transmits the data to the game device 30 of the user A. The network game management device 20 also reads the data of the user A from the auxiliary storage 23 and transmits the data to the game device 30 of the user B. The game devices 30 store the data of the competition opponent in the main memory 32. From this point on, data are exchanged between the game devices 30 based on the data of the competition opponent (IP address).

Figure 6:
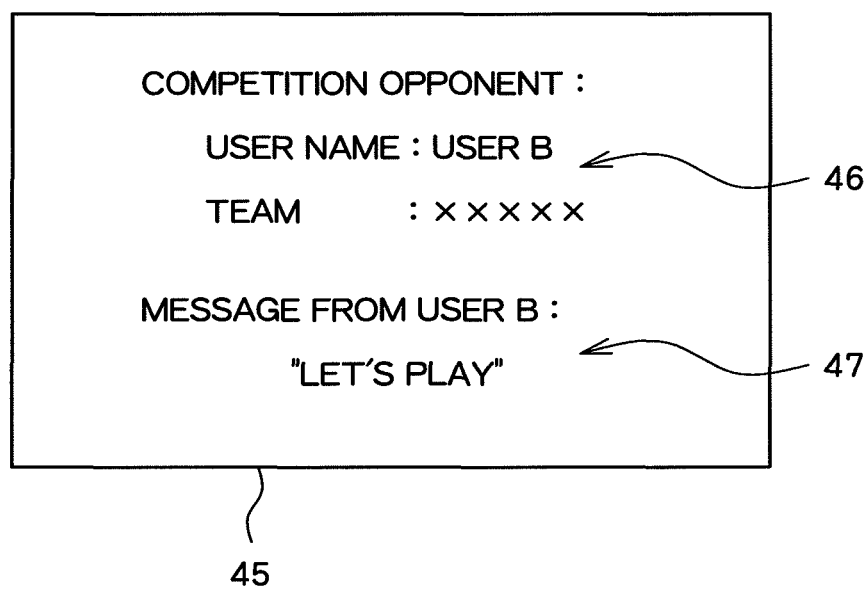
FIG. 6 is a diagram showing an example of a competition opponent guiding screen.

In a case where the game device 30 receives the data of the competition opponent, the game device 30 displays a competition opponent guiding screen (S103). FIG. 6 shows an example of a competition opponent guiding screen. A competition opponent guiding screen 45 shown in FIG. 6 comprises a competition opponent information field 46 and a competition opponent message field 47. Information of the competition opponent is displayed in the competition opponent information field 46. During the display of the competition opponent guiding screen 45, the user inputs a message to the competition opponent. The message which is input by the user is transmitted to the game device 30 of the competition opponent. A message from the competition opponent is displayed in the competition opponent message field 47.

After the message from the competition opponent is displayed on the competition opponent guiding screen 45, the match is started (S104). The match is completed at a time after a match time, which includes a predetermined base match time and an extended match time (injury time) determined according to the progress of the match, has elapsed. If the scores of the teams are tied at the time when the match time has elapsed, the match may be completed as a tie or may be completed after the win and loss are determined by a penalty shoot-out. In the present specification, the completion of the match after the match is continued to the end without ending partway through the competition will be described as a "normal completion of a match". In other words, the completion of the match after the match time has elapsed and the completion of the match after win and loss are determined through the penalty shoot-out will be described as a "normal completion of a match".

Figure 7:
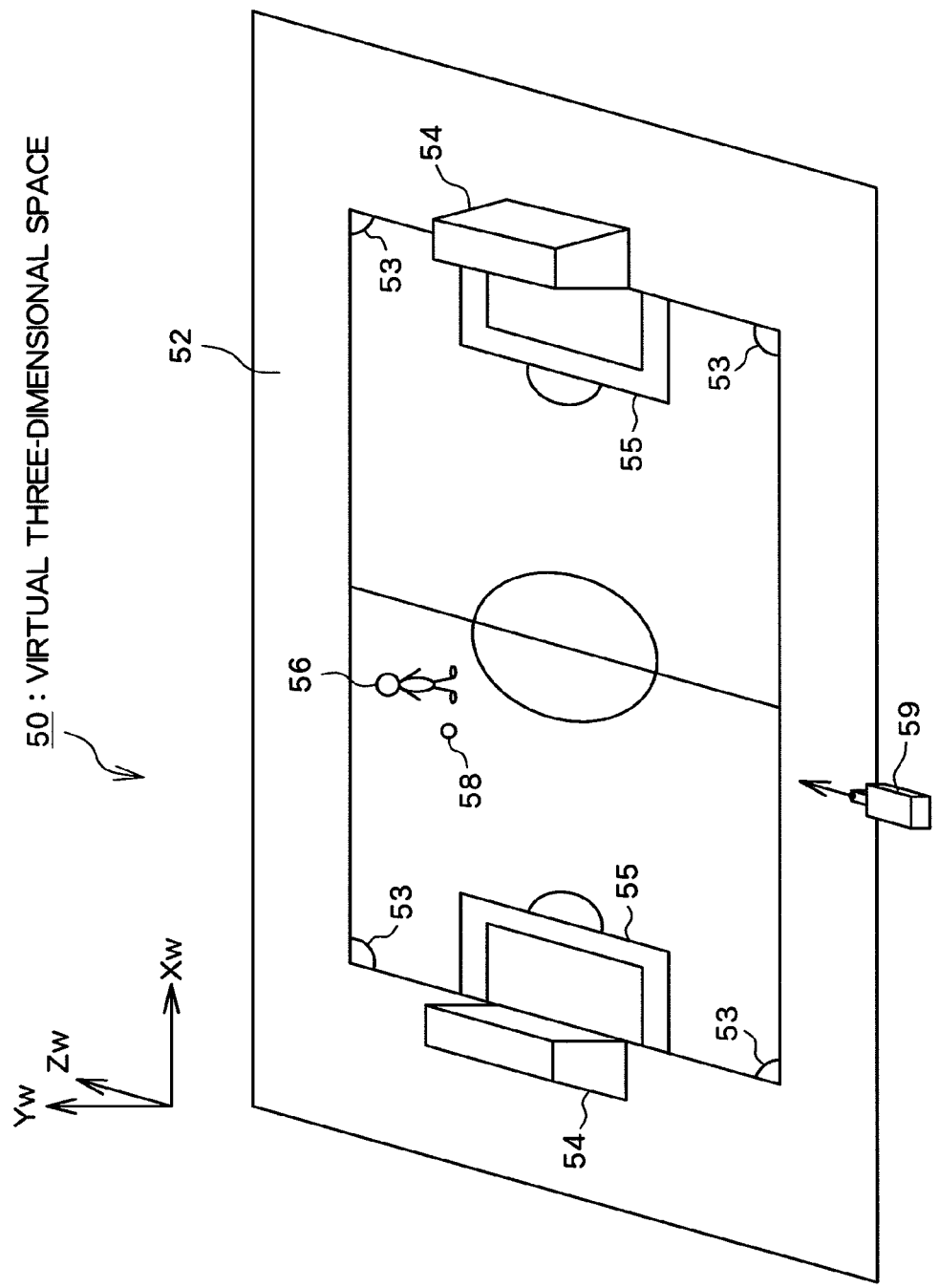
FIG. 7 is a diagram showing an example of a virtual three-dimensional space.

During the match, a common virtual three-dimensional space is constructed in the main memories 32 of the game devices 30. FIG. 7 shows an example of a virtual three-dimensional space. As shown in FIG. 7, a field object 52 representing a soccer field is placed in a virtual three-dimensional space 50. For example, a corner area 53, a penalty area 55, etc. are represented on the field object 52. In addition, a goal object 54 representing a goal, a player object 56 representing a soccer player, and a ball object 58 representing a soccer ball are placed on the field object 52. Although not shown in FIG. 7, 22 player objects 56 are placed in the virtual three-dimensional space 50.

In addition, a virtual camera 59 is placed in the virtual three-dimensional space 50. The virtual camera 59 moves, for example, according to the ball object 58. During the match, a game screen representing a scene of the virtual three-dimensional space 50 viewed from the virtual camera 59 is displayed on the display units 37 of the game devices 30. The user operates the player object 56 of the user's team using the operation inputting unit 36 while viewing the game screen.

In the present embodiment, one of the game device 30 of the user and the game device 30 of the competition opponent plays the role of a game server, to realize the common virtual three-dimensional space 50 between the game devices 30. In other words, the main memory 32 of the game device 30 functioning as the game server stores game status data indicating a most recent game status. In addition, a copy of the game status data is stored in the main memory 32 of the other game device 30. The game status data includes, for example, data indicating the progress of the match and the data indicating the current state of the virtual three-dimensional space 50. FIG. 8 shows an example of the game status data.

The match progress data is data which indicates the progress of the match, and includes match time data, score data, foul data, yellow/red card data, player substitution data, and ball possession time data. The match time data indicates the length of the injury time and elapsed time from the start of the match. The score data indicates scores of both teams. The foul data includes data related to the fouls committed by the player objects 56 of both teams. The yellow/red card data includes data related to a yellow card and a red card issued for the player objects 56 of both teams. The player substitution data indicates the contents of the player substitutions of both teams. The number of people and number of times of the player substitution which are possible in a match are limited to predetermined numbers of people and of times (for example, three people and three times). The ball possession time data indicates a total time of possession of the ball object 58 by the player objects 56 of the teams.

The state data of the virtual camera 59 includes data indicating a current position and a direction of the line of sight of the virtual camera 59. The state data of the ball object 58 includes data indicating, for example, a current position, a movement direction, and a movement speed of the ball object 58. The state data of the player object 56 includes data indicating, for example, a current position, a current posture, a movement direction, a movement speed, and an action type (for example, dashing, passing, and shooting) of the player object 56. The state data of the player object 56 also includes an operation target flag and a ball possession flag. The operation target flag indicates whether or not the player object 56 is an operation target of the user or the competition opponent. The ball possession flag indicates whether or not the player object 56 is in possession of the ball object 58.

Figure 9:
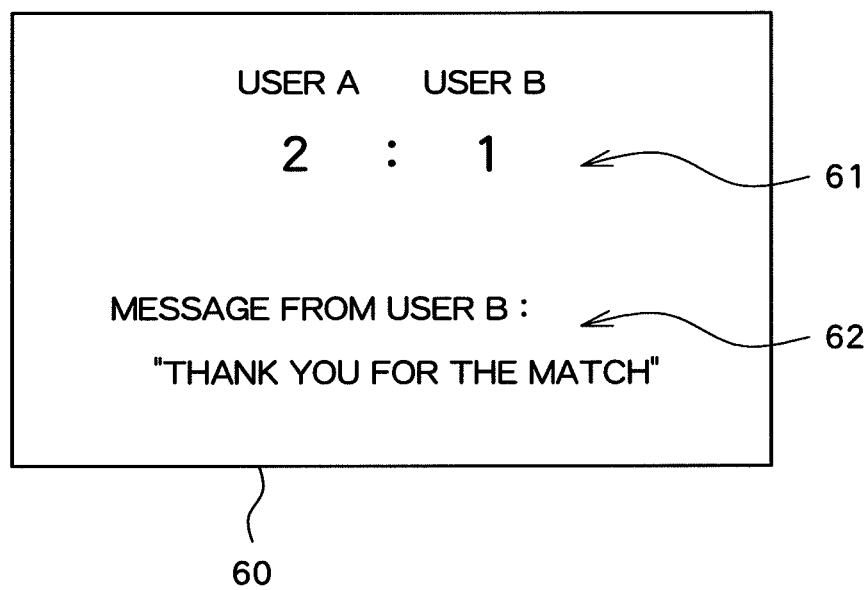
FIG. 9 is a diagram showing an example of a match result screen.

As shown in FIG. 4, when the match is normally completed (when the competition is completed), a match result screen is displayed on the game devices 30 of the user and of the competition opponent (S105). FIG. 9 shows an example of the match result screen. A match result screen 60 shown in FIG. 9 includes a match result display field 61 and a competition opponent message field 62. A match result is displayed in the match result display field 61. During the display of the match result screen 60, the user inputs a message to the competition opponent. The message which is input by the user is transmitted to the game device 30 of the competition opponent. The message from the competition opponent is displayed in the competition opponent message field 62. After a predetermined time has elapsed after the message from the competition opponent is displayed in the match result screen 60, the menu screen 40 is displayed (S101). When the match is completed normally, the total competition record of the user (refer to FIGS. 11 and 12 to be described later) to be stored in the game card 34 of the game device 30 is updated based on the match result.

In the above-described network game system 10, when the communication connection between the game devices 30 is disconnected during the competition, the game status data cannot be shared between the game devices 30. As a result, the soccer game cannot be continued, and the competition ends partway through the competition.

In addition, in the network game system 10, in principle, the total competition record (number of wins, number of losses or total conceded scores, etc.) of the user is updated based on the match result when the match is normally completed. In a network game system where the total competition record of the user is not updated unless the match is completed normally, for example, a user who becomes likely to lose may intentionally disconnect the power supply or the communication connection of the game device 30 (or communication device such as a router to which the game device 30 is connected) during the match, in order to avoid an increase in the number of losses of the user. Alternatively, a user who has allowed the competition opponent to score may intentionally disconnect the power supply or communication connection of the game device 30 (or the communication device such as a router to which the game device 30 is connected) during a match, in order to avoid an increase in the total conceded scores of the user. If such behavior of the users is left undealt with, the interest of the competitive soccer game may be lost. A technique for inhibiting a user from intentionally disconnecting the power supply or communication connection of the game device 30 during the competition in the network game system 10 will now be described.

Figures 10, 11:
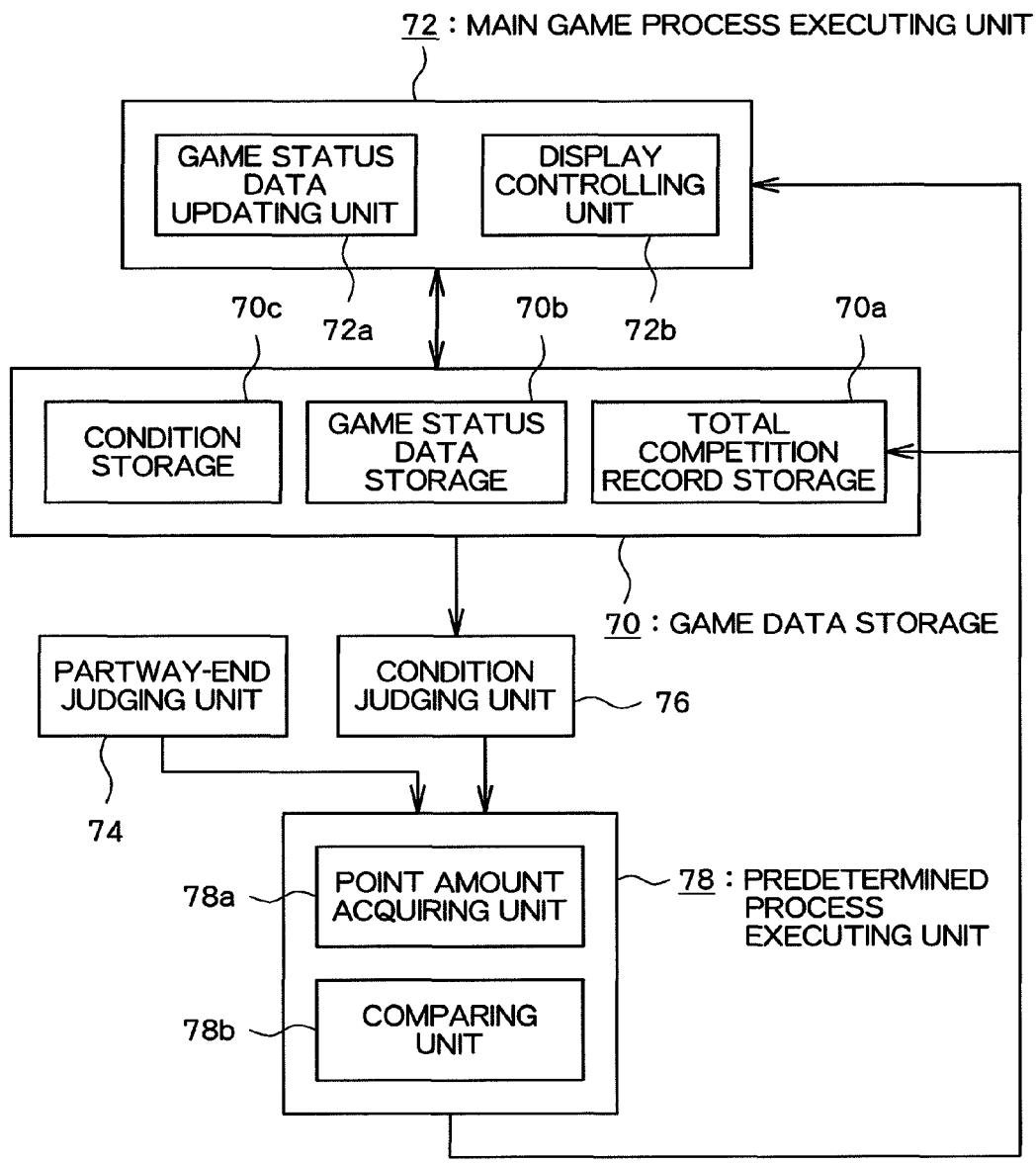
FIG. 10 is a functional block diagram of a network game system according to the embodiment of the present invention.
FIG. 11 is a diagram showing an example of total competition record data.

FIG. 10 is a functional block diagram showing functions, among the functions realized by the network game system 10, which are related to the present invention. As shown in FIG. 10, the network game system 10 comprises functions of a game data storage 70, a main game process executing unit 72, a partway-end judging unit 74, a condition judging unit 76, and a predetermined process executing unit 78. These functional blocks are realized, for example, in each game device 30. In other words, these functional blocks are realized by each game device 30 executing a program.

[Game Data Storage]

The game data storage 70 is realized with, for example, the main memory 32 and the game card 34. The game data storage 70 stores various data related to the competitive soccer game.

For example, the game data storage 70 (game card 34) stores team data of the user. In addition, for example, the game data storage 70 (main memory 32) stores the team data of the competition opponent. The team data includes data which indicates a setting content (for example, the starter players, formation, etc.) of the team. The team data also includes ability parameters and condition parameters of the player objects 56 belonging to the team. The ability parameters are numerical value parameters which indicate the level of various abilities (for example, passing ability and shooting ability) of the player object 56. For example, the ability parameter may take an integer value of 0-100. In a case where the ability of the player object 56 is high, the ability parameter of the player object 56 is set at a high value. The condition parameter, on the other hand, is parameter indicating the condition of the player object 56. For example, the condition parameter may also take an integer value of 0-100. For a player object 56 with a better condition, a higher value is set for the condition parameter of the player object 56. During the match, the value of the ability parameter of the player object 56 is changed based on the value of the condition parameter of the player object 56. For example, the value of the ability parameter of the player object 56 who is in a good condition is changed to a higher value than usual. In addition, for example, the value of the ability parameter of the player object 56 who is in a bad condition is changed to a lower value than usual.

In addition, the game data storage 70 comprises a total competition record storage 70a, a game status data storage 70b, and a condition storage 70c (base numerical value storage unit).

[Total Competition Record Storage]

The total competition record storage 70a is realized, for example, with the game card 34. The total competition record storage 70a stores the total competition record data of the user of the game device 30. For example, the total competition record storage 70a of the game device 30 of the user A stores the total competition record data of the user A. FIGS. 11 and 12 show an example of data stored in the total competition record storage 70a.

FIG. 11 shows an example of total competition record data. The total competition record data shown in FIG. 11 includes a "total competition record" field, a "total score" field, a "total conceded score" field, a "total number of fouls" field, and a "number of communication disconnections" field. The "total competition record" field indicates a number of competitions, a number of wins, a number of losses, and a number of ties of the user. The "total score" field indicates a total sum of scores of the user. The "total conceded score" field indicates a total sum of the conceded scores of the user. The "total number of fouls" field indicates a total sum of fouls committed by the user. The "partway-end number" field indicates a total sum of times in which the competition has ended partway through the competition. The total competition record data is updated based on the match result in a case where the match is completed normally without having ended partway through the competition (refer to S312 of FIG. 17 to be described later).

FIG. 12 shows an example of competition history data. The competition history data shown in FIG. 12 includes a "date and time" field, a "win and loss" field, a "score" field, and a "conceded score" field. The "date and time" field indicates the date and time of competition. The "win and loss" field indicates the win and loss result of the competition. The value of "0" indicates that the user has lost, the value of "1" indicates that the user has won, and the value of "2" indicates that the user has tied with the competition opponent. The "score" field indicates the scores of the user. The "conceded score" field indicates the scores of the competition opponent. The competition history data is also updated based on the match result in a case where the match is normally completed without having ended partway through the competition (refer to S312 of FIG. 17 to be described later).

[Game Status Data Storage]

The game status data storage 70b is realized, for example, with the main memory 32. The game status data storage 70b stores the game status data (refer to FIG. 8).

[Condition Storage]

The condition storage 70c is realized, for example, with the game card 34. The condition storage 70c stores a plurality of conditions (judgment standards) for judging whether or not the possibility that the user has intentionally disconnected the power supply or communication connection of the game device 30 during the competition is high. Here, the "plurality of conditions" may include conditions related to, for example, the total competition record of the user, the user team (team operated by the user), the competition opponent team (team operated by the competition opponent), or the game status.

FIGS. 13 and 14 show an example of condition data stored in the condition storage 70c. The condition data shown in FIGS. 13 and 14 is data in which an ID, a condition, and a point amount (base numerical value) are correlated. The ID indicates information which uniquely identifies each condition. The point amount indicates a weight of each condition. For conditions that indicate a higher possibility that the user has intentionally disconnected the power supply or communication connection of the game device 30 during the competition, higher point amounts are set.

Conditions of IDs "101"-"107" are conditions related to the total competition record of the user.

The condition of ID "101" is a condition indicating whether or not the total competition record of the user is all wins. The condition of ID "102" is a condition indicating whether or not a total conceded score of the user is 0. The condition of ID "103" is a condition indicating whether or not a total number of fouls of the user is 0. The condition of ID "104" is a condition indicating whether or not 10 most recent competition results of the user are all wins. The condition of ID "105" is a condition indicating whether or not conceded scores in 5 most recent competitions of the user are all 0.

As described above, in the network game system 10, in principle, the total competition record of the user (number of wins, number of losses or total conceded scores, etc.) is updated based on the match result in a case where the match is completed normally. For example, because it is difficult to continue successively winning in a competition of the soccer game, a user whose total competition record is all wins may be considered as possibly having disconnected the power supply or the communication connection of the game device 30 when the user became likely to lose in the past competition, in order to avoid the increase in the number of losses. Therefore, the condition of ID "101" is set as a judgment standard for judging whether or not there is a possibility that the user has intentionally disconnected the power supply or communication connection of the game device 30 during competition. In addition, for example, because it is difficult to successively continue matches without any conceded scores in the competition of the soccer game, a user whose total conceded score is 0 may be considered as possibly having disconnected the power supply or communication connection of the game device 30 when the competition opponent scored a goal in the past competition, in order to avoid the increase in the total conceded scores. Therefore, the condition of ID "102" is set as a judgment standard for judging whether or not there is a possibility that the user has intentionally disconnected the power supply or communication connection of the game device 30 during competition. With similar considerations, the conditions of IDs "103"-"105" are also set as the judgment standards for judging whether or not there is a possibility that the user has intentionally disconnected the power supply or communication connection of the game device 30 during the competition.

A condition of ID "106" is a condition indicating whether or not the number of partway ends of the user is once or more. A condition of ID "107" is a condition indicating whether or not the frequency of the partway end of the user is high. For example, when the number of partway end of the user is not 0 or when the frequency of the partway end of the user is high, it may be considered that there is a possibility that the user has disconnected the power supply or communication connection of the game device 30 during the competition. Therefore, the conditions of IDs "106" and "107" are set as judgment standards for judging whether or not there is a possibility that the user has intentionally disconnected the power supply or the communication connection of the game device 30 during the competition.

Conditions of IDs "108"-"110" are conditions related to the user team or the competition opponent team.

A condition of ID "108" is a condition indicating whether or not the competition opponent team is a strong team. A condition of ID "109" is a condition indicating whether or not the ability parameters of the competition opponent team significantly exceed the ability parameters of the user team. A condition of ID "110" is a condition indicating whether or not the condition parameter of the user team is low. For example, in a case where the competition opponent team is a strong team, the possibility of the loss of the user is high. Therefore, if the competition has ended partway in a case where the competition opponent team is a strong team, it may be considered that there is a possibility that the user has disconnected the power supply or communication connection of the game device 30 during the competition, in order to avoid a loss. Therefore, the condition of the ID "108" is set as a judgment standard for judging whether or not there is a possibility that he user has intentionally disconnected the power supply or communication connection of the game device 30 during the competition. With similar considerations, the conditions of IDs "109" and "110" are also set as judgment standards for judging whether or not there is a possibility that the user has intentionally disconnected the power supply or communication connection of the game device 30 during the competition.

Conditions of IDs "201"-"217" are conditions related to the game status.

A condition of ID "201" is a condition indicating whether or not the score of the user team is lower than the score of the competition opponent team. A condition of ID "202" is a condition indicating whether or not the score of the user team is 0. For example, in a case where the score of the user team is lower than the score of the competition opponent team at the time when the competition has ended partway through the competition, it may be considered that there is a possibility that the user has disconnected the power supply or communication connection of the game device 30, in order to avoid a loss. Therefore, the condition of ID "201" is set as a judgment standard for judging whether or not there is a possibility that the user has intentionally disconnected the power supply or communication connection of the game device 30 during the competition. With similar considerations, the condition of the ID "202" is also set as a judgment standard for judging whether or not there is a possibility that the user has intentionally disconnected the power supply or communication connection of the game device 30 during the competition.

A condition of ID "203" is a condition indicating whether or not the number of red cards of the user team is 1 or more. A condition of ID "204" is a condition indicating whether or not a number of yellow cards of the user team is 1 or more. A condition of ID "205" is a condition indicating whether or not the remaining number of player substitutions of the user team is 0. For example, in a case where the number of red cards of the user team is 1 or more at the time when the competition has ended partway through the competition, it may be considered that the user team is in a disadvantageous situation compared to the competition opponent team at that point. Therefore, the player may be considered as possibly having disconnected the power supply or communication connection of the game device 30 during the competition. Therefore, the condition of ID "203" is set as a judgment standard for judging whether or not there is a possibility that the user has intentionally disconnected the power supply or communication connection of the game device 30 during the competition. In similar considerations, conditions of IDs "204" and "205" are also set as judgment standards for judging whether or not there is a possibility that the user has intentionally disconnected the power supply or communication connection of the game device 30.

A condition of ID "206" is a condition indicating whether or not the remaining time of the match is short. In a case where the remaining time of the match is short at the time when the competition has ended partway through the competition, it may be considered that there is a possibility that the user has disconnected the power supply or communication connection of the game device 30 in order to avoid a loss. Therefore, the condition of ID "206" is set as a judgment standard for judging whether or not there is a possibility that the user has intentionally disconnected the power supply or communication connection of the game device 30 during the competition.

A condition of ID "207" is a condition indicating whether or not the ball possession percentage of the user team is significantly lower than the ball possession percentage of the competition opponent team. In a case where the ball possession percentage of the user team is significantly lower than the ball possession percentage of the competition opponent team at the time when the competition has ended partway through the competition, it can be considered that the user team is in a disadvantageous situation compared to the competition opponent team at that point. Therefore, in this case, it may be considered that there is a possibility that the user has disconnected the power supply or communication connection of the game device 30 during the competition. Therefore, the condition of ID "207" is set as a judgment standard for judging whether or not there is a possibility that the user has intentionally disconnected the power supply or communication connection of the game device 30 during the competition.

A condition of ID "208" is a condition indicating whether or not the player object 56 of the competition opponent team is in possession of the ball object 58 in the penalty area 55 of the user team. The "penalty area 55 of the user team" refers to the penalty area 55 on the side on which the goal object 54 of the user team is placed. The "goal object 54 of the user team" is the goal object 54 to be defended by the user. A condition of ID "209" is a condition indicating whether or not the player object 56 of the competition opponent team is in possession of the ball object 58 in an area in which a cross pass is possible. A condition of ID "210" is a condition indicating whether or not a number of player objects 56 of the user team positioned between the player object 56 of the competition opponent team who is in possession of the ball object 58 and the goal object 54 of the user team is 1 or less. A condition of ID "211" is a condition indicating whether or not it is immediately after an opportunity of a free kick is awarded to the competition opponent team in front of the goal object 54 of the user team. A condition of ID "212" is a condition indicating whether or not it is immediately after an opportunity of a penalty kick is awarded to the competition opponent team. For example, in a case where the player object 56 of the competition opponent team is in possession of the ball object 58 in the penalty area 55 of the user team at the time when the competition has ended partway through the competition, it may be considered that the user team is in a disadvantageous situation. Because of this, in this case, the user who fears they may allow a score may have intentionally disconnected the power supply or communication connection of the game device 30 during the competition. Therefore, the condition of ID "208" is set as a judgment standard for judging whether or not there is a possibility that the user has intentionally disconnected the power supply or communication connection of the game device 30 during the competition. In similar considerations, conditions of IDs "209"-"212" are also set as judgment standards for judging whether or not there is a possibility that the user has intentionally disconnected the power supply or communication connection of the game device 30 during the competition.

A condition of ID "213" is a condition indicating whether or not it is immediately after the competition opponent team has scored a goal. A condition of ID "214" is a condition indicating whether or not it is immediately after the competition opponent team has scored a go-ahead goal. A condition of ID "215" is a condition indicating whether or not it is immediately after the player object 56 of the user team has missed a penalty kick. For example, if it is immediately after the competition opponent team has scored a goal when the competition has ended partway through the competition, there may be a possibility that a user who does not like the conceded score has disconnected the power supply or communication connection of the game device 30. Therefore, the condition of ID "213" is set as a judgment standard for judging whether or not there is a possibility that the user has intentionally disconnected the power supply or communication connection of the game device 30 during the competition. In similar considerations, the conditions of IDs "214" and "215" are also set as judgment standards for judging whether or not there is a possibility that the user has intentionally disconnected the power supply or communication connection of the game device 30 during the competition.

A condition of ID "216" is a condition indicating whether or not the match is currently in injury time. A condition of ID "217" is a condition indicating whether or not the match is currently in the penalty shoot-off. For example, in a case where the time when the competition ends is during injury time, it may be considered that there is a possibility that the user has disconnected the power supply or communication connection of the game device 30 in order to avoid a loss. Therefore, the condition of ID "216" is set as a judgment standard for judging whether or not there is a possibility that the user has intentionally disconnected the power supply or communication connection of the game device 30 during the competition. In similar considerations, the condition of ID "217" is also set as a judgment standard for judging whether or not there is a possibility that the user has intentionally disconnected the power supply or communication connection of the game device 30 during the competition.

[Main Game Process Executing Unit]

The main game process executing unit 72 is realized, for example, with the controlling unit 31. The main game process executing unit 72 executes a process for realizing the competitive soccer game. The main game process executing unit 72 includes a game status data updating unit 72a and a display controlling unit 72b.

[Game Status Data Updating Unit]

The game status data updating unit 72a executes a game process at every predetermined period (for example, every $\frac{1}{60}^{th}$ of a second), to update the game status data stored in the game status data storage 70b. The operation of the game status data updating unit 72a differs between the case when the game device 30 plays the role of the game server and the case when the game device 30 does not play the role of the game server. The details will be described later (refer to S301 of FIG. 17).

[Display Controlling Unit]

The display controlling unit 72b displays the menu screen 40, the competition opponent guiding screen 45, and the match result screen 60 on the display unit 37. The display controlling unit 72b also generates, during a match, a game screen representing a scene of the virtual three-dimensional space 50 viewed from the virtual camera 59, based on the game status data stored in the game status data storage 70b. The display controlling unit 72b displays the game screen on the display unit 37. The display controlling unit 72b updates the game screen at every predetermined period (for example, every $\frac{1}{60}^{th}$ of a second) during the match.

[Partway-End Judging Unit]

The partway-end judging unit 74 is realized, for example, with the controlling unit 31. The partway-end judging unit 74 judges whether or not the competition (match) has ended partway through the competition. In the case of the present embodiment, the partway-end judging unit 74 judges whether or not the previous competition has ended partway through the competition in a case where the display of the menu screen 40 is started (refer to S101 of FIG. 4).

[Condition Judging Unit]

The condition judging unit 76 is realized with, for example, the controlling unit 31. The condition judging unit 76 judges whether or not each of the plurality of conditions stored in the condition storage 70c is satisfied, based on the data stored in the game data storage 70. For example, the condition judging unit 76 judges whether or not the total competition record of the user satisfies the conditions of IDs "101"-"107" based on the total competition record data or the competition history data. In addition, for example, the condition judging unit 76 judges whether or not the user team or the competition opponent team satisfies the conditions of IDs "108"-"110" based on the team data of the user or of the competition opponent. Moreover, for example, the condition judging unit 76 also judges whether or not the game status satisfies the conditions of IDs "201"-"217" based on the game status data.

In the case of the present embodiment, the condition judging unit 76 judges, prior to the start of the match, whether or not the total competition record of the user satisfies the conditions of IDs "101"-"107", and judges whether or not the user team or the competition opponent team satisfies the conditions of IDs "108"-"110". The condition judging unit 76 also judges, during the match, whether or not the game status satisfies the conditions of IDs "201"-"217" at every predetermined period (for example, every $\frac{1}{60}^{th}$ of a second).

[Predetermined Process Executing Unit]

The predetermined process executing unit 78 is realized, for example, with the controlling unit 31. In a case where the partway-end judging unit 74 judges that the competition has ended partway through the competition, the predetermined process executing unit 78 executes a predetermined process based on a judgment result of whether or not the conditions of IDs "101"-"110" are satisfied and a judgment result of whether or not the game status at the time when the competition has ended partway through the competition satisfies the conditions of IDs "201"-"217".

[Point Amount Acquiring Unit and Comparing Unit]

The predetermined process executing unit 78 comprises a point amount acquiring unit 78a (numerical value acquiring unit) and a comparing unit 78b. The point amount acquiring unit 78a acquires a point amount (numerical value) corresponding to the judgment result of whether or not the conditions of IDs "101"-"110" are satisfied and the judgment result of whether or not the game status at the time when the competition has ended partway through the competition satisfies the conditions of IDs "201"-"217".

In the case of the present embodiment, the point amount acquiring unit 78a calculates a total Pa of the point amounts correlated to the conditions judged as being satisfied, among the conditions of IDs "101"-"110". The point amount acquiring unit 78a also calculates a total Pb of the point amounts correlated to the conditions satisfied by the game status at the time when the competition has ended, among the conditions of IDs "201"-"217". The point amount acquiring unit 78a then acquires a sum of the point amounts (Pa+Pb). As described above, the condition judging unit 76 judges, during the match, whether or not the game status satisfies the conditions of IDs "201"-"217" at every predetermined period (for example, every $1/60^{th}$ of a second). The point amount acquiring unit 78a calculates, during the match, the point amount Pb corresponding to the judgment result of the conditions of IDs "201"-"217" at every predetermined period (for example, every $1/60^{th}$ of a second). Therefore, the point amount acquiring unit 78a calculates, during the match, the point amount (Pa+Pb) at every predetermined period (for example, every $1/60^{th}$ of a second).

The comparing unit 78b compares the point amount (Pa+Pb) acquired by the point amount acquiring unit 78a with a predetermined reference point amount (Pc). In the case of the present embodiment, the comparing unit 78b judges whether or not the point amount (Pa+Pb) acquired by the point amount acquiring unit 78a is greater than or equal to the predetermined reference point amount (Pc). Here, a case with a higher point amount acquired by the point amount acquiring unit 78a means that the possibility that the user has disconnected the power supply or communication connection of the game device 30 during the competition is high. Therefore, the comparing unit 78b can be said to be judging whether or not the possibility that the use has intentionally disconnected the power supply or communication connection of the game device 30 during the competition is high.

In the case of the present embodiment, the comparing unit 78b judges whether or not the point amount (Pa+Pb) which is acquired during the match at every predetermined period (for example, every $1/60^{th}$ of a second) is greater than or equal to the predetermined reference point amount (Pc). The comparing unit 78b stores data indicating the judgment result in the game card 34.

The predetermined process executing unit 78 executes a predetermined process based on the comparison result by the comparing unit 78b in a case where the partway-end judging unit 74 judges that the competition has ended partway through the competition. In the case of the present embodiment, if the comparing unit 78b judges that the point amount (Pa+Pb) acquired by the point amount acquiring unit 78a is greater than or equal to the predetermined reference point amount (Pc), the predetermined process executing unit 78 executes a predetermined process. In other words, in a case where it is judged that the possibility that the user has disconnected the power supply or communication connection of the game device 30 during the competition is high, the predetermined process executing unit 78 executes a predetermined process.

In the case of the present embodiment, the "predetermined process" includes, for example, a process to update the total competition record of the user. More specifically, the "predetermined process" includes a process to increase the number of losses of the user. Because of this, in the present embodiment, in a case where the competition has ended partway through the competition, if it is judged that the possibility that the user has disconnected the power supply or communication connection of the game device 30 during the match is high, the number of losses of the user is increased.

In addition, in the case of the present embodiment, the "predetermined process" includes a process, for example, to restrict competition of the user with the other users. More specifically, the "predetermined process" includes a process to prohibit the user from competing against other users until a time limit for competition restriction has elapsed. Because of this, in the present embodiment, in a case where the competition has ended partway through the competition, if it is judged that the possibility that the user has disconnected the power supply or communication connection of the game device 30 during the competition is high, the user is prohibited from competing against other users until the time limit for competition restriction has elapsed.

Moreover, in the case of the present embodiment, the "predetermined process" includes, for example, a process to output a predetermined message. More specifically, the "predetermined process" includes a process to output an alert message to the user. Because of this, in the present embodiment, in a case where the competition has ended partway through the competition, if it is judged that the possibility that the user has disconnected the power supply or communication connection of the game device 30 during the competition is high, an alert message is output to the user.

Figure 15:
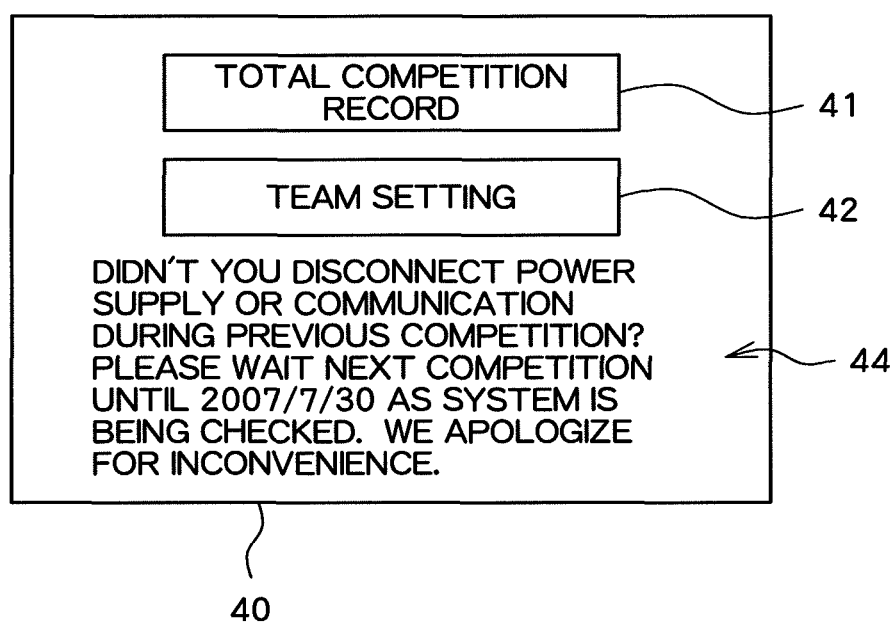
FIG. 15 is a diagram showing an example of a menu screen.

In the present embodiment, in a case where the competition has ended partway through the competition, if it is judged that the possibility that the user has disconnected the power supply or communication connection of the game device 30 during the match is high, the predetermined process executing unit 78 displays, on the display unit 37, a menu screen 40 as shown in, for example, FIG. 15, in place of the menu screen 40 of FIG. 5. The menu screen 40 shown in FIG. 15 includes an alert message field 44 in place of the competition request button 43. An alert message for the user is displayed in the alert message field 44. In addition, because the competition request button 43 is not displayed on the menu screen 40 of FIG. 15, the user cannot compete against other users. In the following description, the menu screen 40 shown in FIG. 5 is referred to as a "normal menu screen" and the menu screen 40 shown in FIG. 15 is referred to as a "restricted menu screen".

Figure 16:
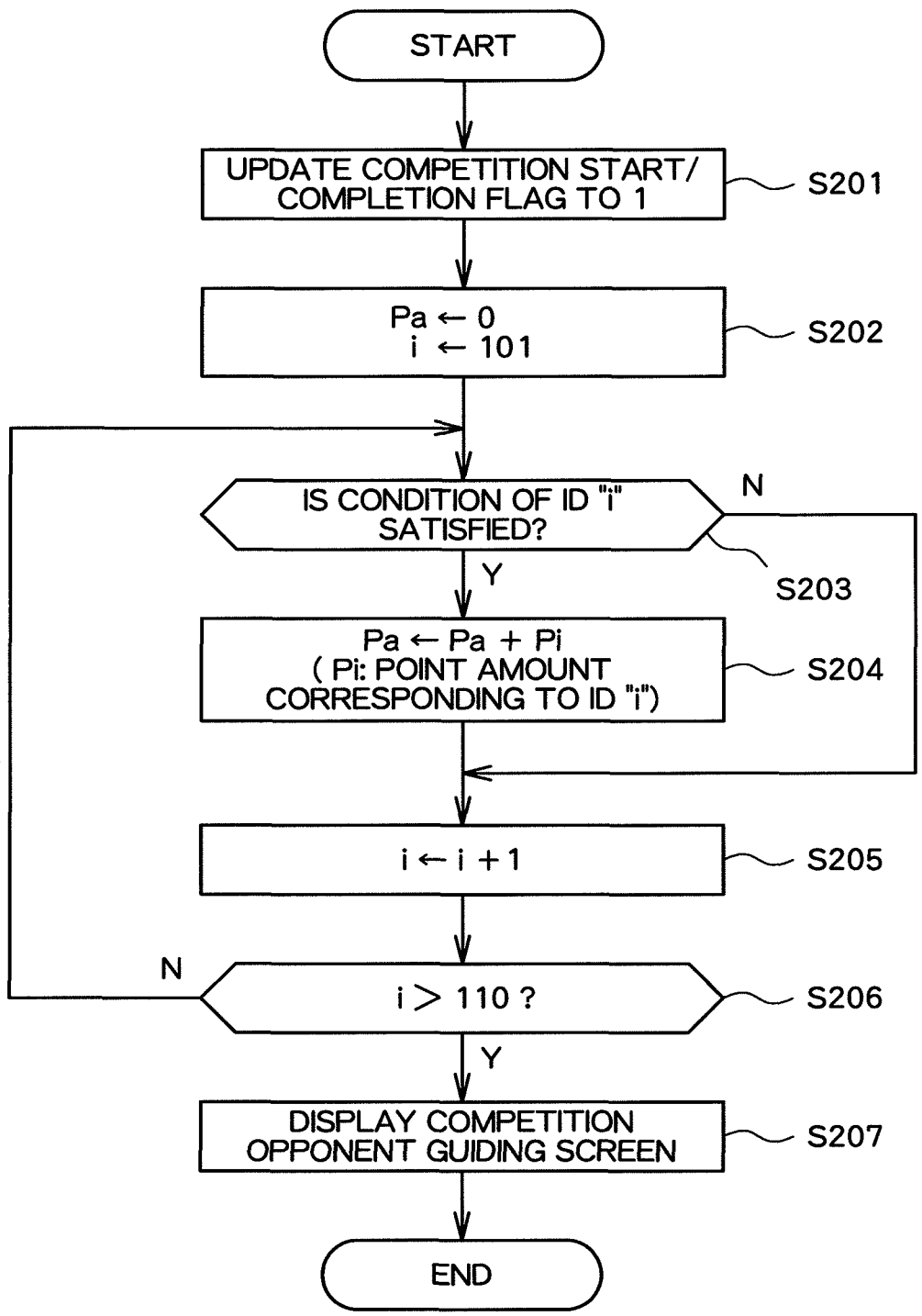
FIG. 16 is a flowchart showing a process which is executed during when the competition opponent guiding screen is displayed.
Figure 17:
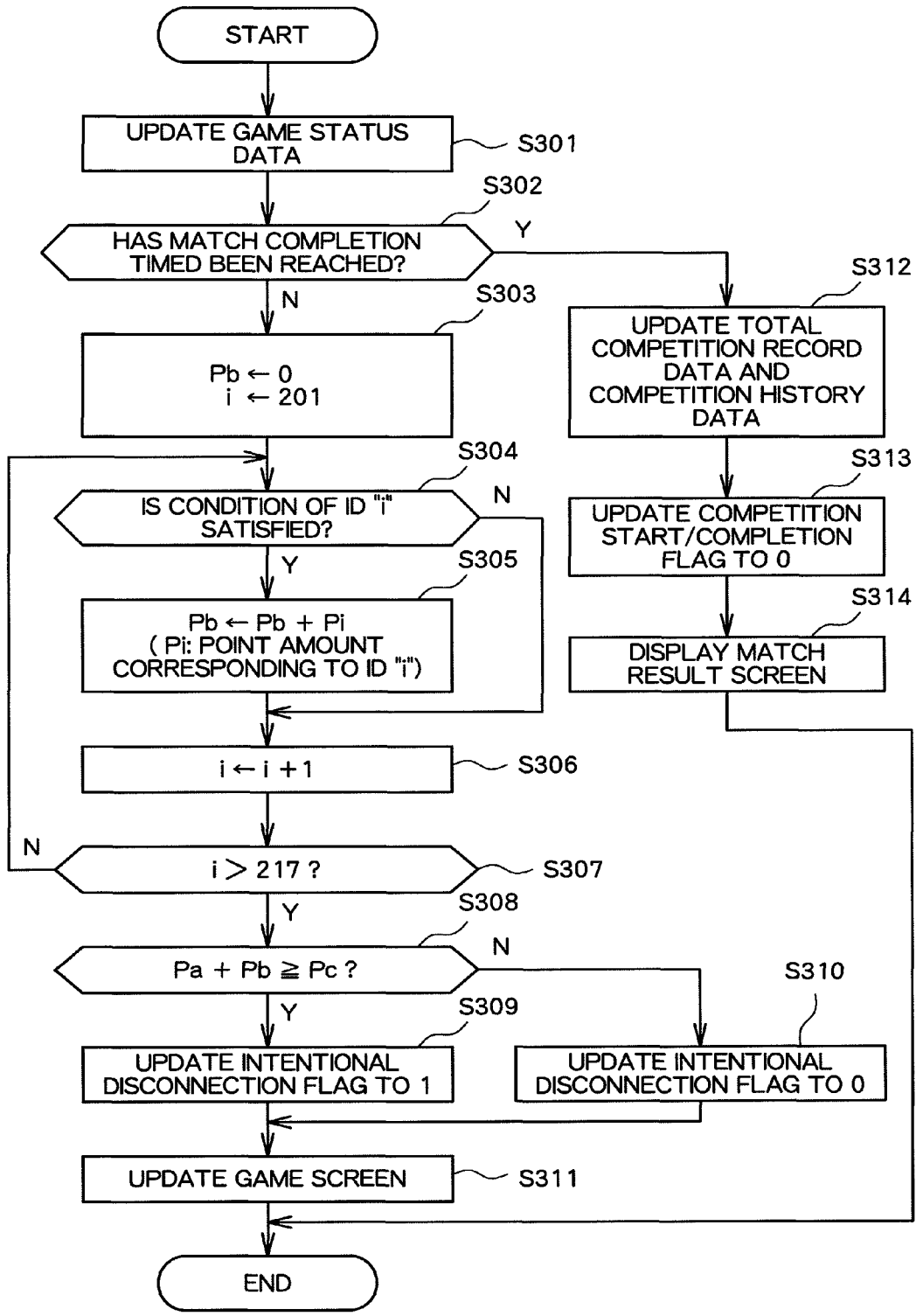
FIG. 17 is a diagram for explaining a process executed at every predetermined period during a match.
Figure 18:
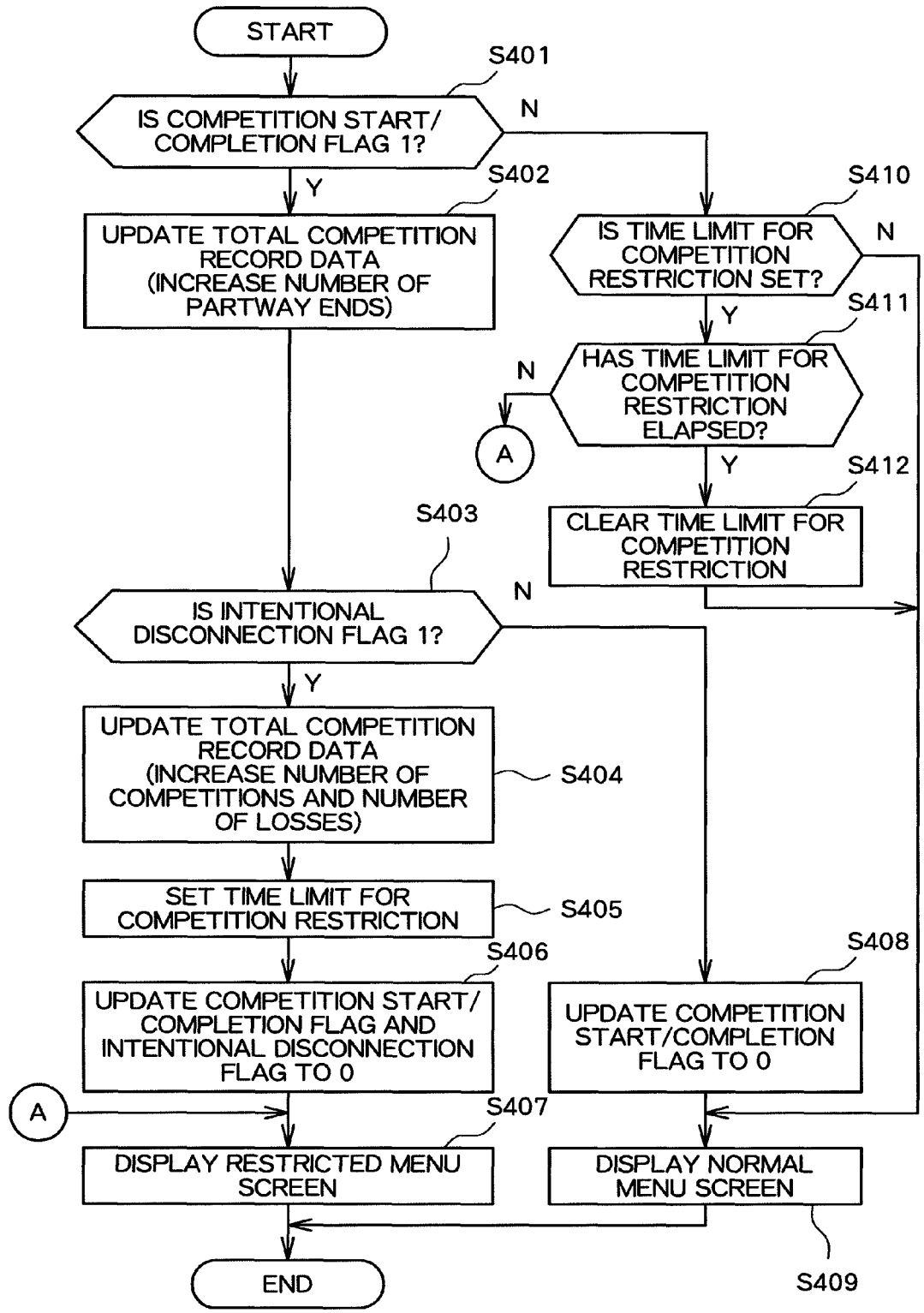
FIG. 18 is a flowchart showing a process executed during when a menu screen is displayed.

Next, a process executed by each game device 30 for realizing the above-described functional blocks will be described. FIGS. 16-18 are flowcharts showing processes executed by each game device 30. The controlling unit 31 executes a process shown in FIGS. 16-18 according to a program stored in the game card 34.

In relation to the process of FIGS. 16-18, data shown in FIG. 19, for example, is stored in the EEPROM of the game card 34. The data shown in FIG. 19 includes a competition start/completion flag, an intentional disconnection flag, and a time limit for competition restriction. The details of these data will be described later.

FIG. 16 shows a process executed by each game device 30 in a case where the competition opponent guiding screen 45 is displayed (refer to S103 of FIG. 4).

As shown in FIG. 16, first, the controlling unit 31 updates the competition start/completion flag to 1 (S201). The controlling unit 31 also initializes a value of a variable Pa to 0 and a value of a variable i to 101 (S202). The controlling unit 31 judges whether or not the condition of the ID "i" is satisfied (S203).

When the variable i is 101, the controlling unit 31 judges whether or not the total competition record of the user is all wins based on the total competition record data. When the variable i is 102, the controlling unit 31 judges whether or not the total conceded scores of the user is 0 based on the total competition record data. When the variable i is 103, the controlling unit 31 judges whether or not the total number of fouls of the user is 0 based on the total competition record data. When the variable i is 104, the controlling unit 31 judges whether or not results of 10 most recent competitions of the user are all wins based on the competition history data. When the variable i is 105, the controlling unit 31 judges whether or not the conceded scores in 5 most recent competitions of the user is 0 based on the competition history data. When the variable i is 106, the controlling unit 31 judges whether or not the number of partway ends of the user is once or more based on the total competition record data.

When the variable i is 107, the controlling unit 31 judges whether or not the frequency of the partway end of the user is high based on the total competition record data. For example, the controlling unit 31 calculates the frequency of partway end by dividing the number of partway ends by the number of competitions. The controlling unit 31 then judges whether or not the frequency of the partway end is greater than or equal to a predetermined reference frequency. When the frequency of the partway end is greater than or equal to the predetermined reference frequency, the controlling unit 31 judges that the frequency of partway end of the user is high.

When the variable i is 108, the controlling unit 31 judges whether or not the competition opponent team is a strong team based on the team data of the competition opponent. In the case of the present embodiment, the game card 34 stores data indicating which team is a strong team among the plurality of teams which are prepared in advance. Based on this data, the controlling unit 31 judges whether or not the competition opponent team (that is, the team selected by the competition opponent from among the plurality of above-described teams) is a strong team. Alternatively, the controlling unit 31 may calculate a statistical value (for example, an average value) of ability parameters of the player objects 56 belonging to the competition opponent team. The controlling unit 31 may then judge whether or not the competition opponent team is a strong team by judging whether or not the statistical value is greater than or equal to a reference value.

When the variable i is 109, the controlling unit 31 judges whether or not the ability parameter of the competition opponent team significantly exceeds the ability parameter of the user team based on the team data of the user and the team data of the competition opponent. Here, the ability parameter of the competition opponent team refers to, for example, a statistical value (for example, an average value) of the ability parameters of the player objects 56 belonging to the competition opponent team. Similarly, the ability parameter of the user team refers to, for example, a statistical value of the ability parameters of the player objects 56 belonging to the user team. For example, the controlling unit 31 judges whether or not the ability parameter of the competition opponent team is greater than the ability parameter of the user team. In addition, when the ability parameter of the competition opponent team is greater than the ability parameter of the user team, the controlling unit 31 judges whether or not a difference in the ability parameter between the competition opponent team and the user team is greater than or equal to a predetermined reference difference.

When the variable i is 110, the controlling unit 31 judges whether or not the condition parameter of the user team is low based on the team data of the user. Here, the condition parameter of the user team refers to, for example, a statistical value (for example, an average value) of the condition parameters of the player objects 56 belonging to the user team. For example, the controlling unit 31 judges whether or not the condition parameter of the user team is less than or equal to a predetermined reference value. When the condition parameter of the user team is less than or equal to the predetermined reference value, the controlling unit 31 judges that the condition parameter of the user team is low.

When it is judged in S203 that the condition of ID "i" is satisfied, the controlling unit 31 adds a point amount Pi of the ID "i" to the variable Pa (S204). When it is judged in S203 that the condition of ID "i" is not satisfied or when the process of S204 is executed, the controlling unit 31 adds 1 to the value of the variable i (S205). Then, the controlling unit 31 judges whether or not the variable i is greater than 110 (S206). That is, the controlling unit 31 judges whether or not judgment of conditions of IDs "101"-"110" is completed. When the variable i is less than or equal to 110, the controlling unit 31 executes the processes of S203-S206. When, on the other hand, the variable i is greater than 110, the controlling unit 31 displays the competition opponent guiding screen 45 on the display unit 37 (S207). In this process, the value of the variable Pa is stored in the game card 34. The value of the variable Pa stored in the game card 34 is used in processes to be described later (refer to S308 of FIG. 17).

FIG. 17 is a flowchart showing a process executed by each game device 30 during the match (refer to S104 of FIG. 4) at every predetermined period (for example, every $\frac{1}{60}^{th}$ of a second).

As shown in FIG. 17, first, the controlling unit 31 updates the game status data stored in the main memory 32 (S301). The processing content of S301 differs between the case where the game device 30 has the role of the game server and the case where the game device 30 does not have the role of the game server.

The process when the game device 30 has the role of the game server will first be described. In this case, the controlling unit 31 judges the operation content of the user based on the data which is input from the operation inputting unit 36. The controlling unit 31 also judges the operation content of the competition opponent based on the operation data transmitted from the game device 30 of the competition opponent. The controlling unit 31 updates the game status data stored in the main memory 32 based on the operation content of the user, the operation content of the competition opponent, the user team data stored in the game card 34, and the competition opponent team data stored in the main memory 32.

For example, the status data of the player objects 56 are updated based on the operation content of the user or of the competition opponent and the ability parameters and condition parameters of the player objects 56. In addition, for example, the state data of the ball object 58 is updated based on the operation content of the user or of the competition opponent. Moreover, for example, the state data of the virtual camera 59 is updated based on the state data of the ball object 58. In addition, a scoring event of the user team or of the competition opponent team is generated based on the state data of the ball object 58. For example, when the ball object 58 has moved into the goal object 54 of the competition opponent team, a scoring event of the user team is generated. Similarly, for example, when the ball object 58 moves into the goal object 54 of the user team, the scoring event of the competition opponent team is generated. When the scoring event of the user team or of the competition opponent team is generated, the score data is updated. Moreover, for example, a foul event of the user team or of the competition opponent team is generated based on the state data of the player objects 56. For example, when the player object 56 of the user team slide-tackles the player object 56 of the competition opponent team, a foul event of the user team is generated based on the positional relationship of the player objects 56, or the like. When the foul event of the user team or of the competition opponent team is generated, the foul data and yellow/red card data are updated. In addition, for example, it is judged whether or not the player object 56 belonging to the user team or to the competition opponent team is in possession of the ball object 58, and the ball possession time data is updated based on a result of the judgment. The match time data and player substitution data are also updated.

In this case, the controlling unit 31 also transmits game status update data indicating the update content of the game status data to the game device 30 of the competition opponent.

Next, a process when the game device 30 does not have the role of the game server will be described. In this case, the controlling unit 31 judges the operation content of the user based on the data which is input from the operation inputting unit 36. The controlling unit 31 transmits the operation data indicating the operation content of the user to the game device 30 (game server) of the competition opponent. The controller 31 also receives the game status update data transmitted from the game device 30 (game server) of the competition opponent, and updates the game status data stored in the main memory 32 based on the game status update data.

After the game status data is updated, the controlling unit 31 judges whether or not a match completion time has been reached based on the match time data (S302). Here, the match completion time is a time when the match is completed normally, and is, for example, a time after the match time has elapsed or after win/loss has been established by the penalty shoot-out. If the match completion time has not been reached, the controlling unit 31 initializes the value of the variable Pb to 0 and initializes the value of the variable i to 201 (S303). The controlling unit 31 then judges whether or not the condition of ID "i" is satisfied based on the game status data stored in the main memory 32 (S304).

When the variable i is 201, the controlling unit 31 judges whether or not the score of the user team is less than the score of the competition opponent team based on the score data. When the variable i is 202, the controlling unit 31 judges whether or not the score of the user team is 0 based on the score data. When the variable i is 203, the controlling unit 31 judges whether or not the number of red cards of the user team is greater than or equal to 1 based on the yellow/red card data. When the variable i is 204, the controlling unit 31 judges whether or not the number of yellow cards of the user team is greater than or equal to 1 based on the yellow/red card data. When the variable i is 205, the controlling unit 31 judges whether or not the remaining number of player substitutions of the user team is 0 based on the player substitution data.

When the variable i is 206, the controlling unit 31 judges whether or not the remaining time of the match is short based on the match time data. For example, the controlling unit 31 judges whether or not the remaining time of the match is less than or equal to a predetermined time. When the remaining time of the match is less than or equal to the predetermined time, the controlling unit 31 judges that the remaining time of the match is short.

When the variable i is 207, the controlling unit 31 judges whether or not the ball possession percentage of the user team is significantly lower than the ball possession percentage of the competition opponent team based on the ball possession time data. For example, the controlling unit 31 calculates the ball possession percentage of the user team by dividing the ball possession time of the user team by the elapsed time from the start of the match. The controlling unit 31 similarly calculates the ball possession percentage of the competition opponent team. The controlling unit 31 then judges whether or not the ball possession percentage of the user team is lower than the ball possession percentage of the competition opponent team. When the ball possession percentage of the user team is lower than the ball possession percentage of the competition opponent team, the controlling unit 31 then judges whether or not a difference in ball possession percentage between the user team and the competition opponent team is greater than or equal to a predetermined reference difference.

When the variable i is 208, the controlling unit 31 judges whether or not the player object 56 of the competition opponent team is in possession of the ball object 58 in the penalty area 55 of the user team, based on, for example, the state data of the player objects 56. For example, the controlling unit 31 judges whether or not the player object 56 of the competition opponent team is in possession of the ball object 58 based on the state data (ball possession flag) of the player objects 56 of the competition opponent team. When the player object 56 of the competition opponent team is in possession of the ball object 58, the controlling unit 31 judges whether or not the player object 56 is positioned in the penalty area 55 of the user team, based on the state data (position data) of the player object 56.

When the variable i is 209, the controlling unit 31 judges whether or not the player object 56 of the competition opponent team is in possession of the ball object 58 in an area in which a cross pass is possible, based on, for example, the state data of the player objects 56. The "area in which cross pass is possible" for the player object 56 of the competition opponent team is an area near the corner area 53 on the side of the goal object 54 of the user team. For example, the controlling unit 31 judges whether or not the player object 56 of the competition opponent team is in possession of the ball object 58 based on the state data (ball possession flag) of the player objects 56 of the competition opponent team. When the player object 56 of the competition opponent team is in possession of the ball object 58, the controlling unit 31 judges whether or not the player object 56 is positioned in the area in which a cross pass is possible, based on the state data (position data) of the player object 56.

When the variable i is 210, the controlling unit 31 judges whether or not the number of player objects 56 of the user team positioned between the player object 56 of the competition opponent team who is in possession of the ball object 58 and the goal object 54 of the user team is one or less, based on, for example, the state data of the player objects 56.

When the variable i is 211, the controlling unit 31 judges whether or not it is immediately after a free kick in front of the goal object 54 of the user team is awarded to the competition opponent team. A case where the free kick in front of the goal object 54 of the user team is awarded to the competition opponent team occurs when a foul event of the user team occurs in front of the goal object 54 of the user team (that is, when the player object 56 of the user team has committed a foul in front of the goal object 54 of the user team). For example, the controlling unit 31 judges whether or not the elapsed time from the occurrence of the foul event of the user team in front of the goal object 54 of the user team is less than or equal to a predetermined time (for example, 10 seconds).

When the variable i is 212, the controlling unit 31 judges whether or not it is immediately after a penalty kick is awarded to the competition opponent team. A case where the penalty kick is awarded to the competition opponent team occurs when a foul event of the user team occurs in the penalty area 55 on the side of the goal object 54 of the user team (that is, when the player object 56 of the user team has committed a foul in the penalty area 55 on the side of the goal object 54 of the user team). For example, the controlling unit 31 judges whether or not the elapsed time from the occurrence of the foul event of the user team in the penalty area 55 on the side of the goal object 54 of the user team is less than or equal to a predetermined time (for example, 10 seconds).

When the variable i is 213, the controlling unit 31 judges whether or not it is immediately after the competition opponent team has scored a goal. For example, the controlling unit 31 judges whether or not the elapsed time from occurrence of a scoring event of the competition opponent team is less than or equal to a predetermined time (for example, 10 seconds).

When the variable i is 214, the controlling unit 31 judges whether or not it is immediately after the competition opponent team has scored a go-ahead goal (a deadlock breaking goal). The "scoring of the go-ahead goal by the competition opponent team" refers to a score of the competition opponent team in the state where the scores of the teams are tied. For example, the controlling unit 31 judges whether or not the elapsed time from the occurrence of a scoring event of the competition opponent team in the state where the scores of the teams are tied is less than or equal to a predetermined time (for example, 10 seconds). The judgment of whether or not the scores of the teams are tied is done based on the score data.

When the variable i is 215, the controlling unit 31 judges whether or not it is immediately after the player object 56 of the user team has missed a penalty kick. When the variable i is 216, the controlling unit 31 judges whether or not it is currently in injury time based on the match time data. When the variable i is 217, the controlling unit 31 judges whether or not it is currently in the penalty shoot-out.

When it is judged in S304 that the condition of ID "i" is satisfied, the controlling unit 31 adds the point amount Pi of the ID "i" to the variable Pb (S305). Then, the controlling unit 31 adds 1 to the variable i (S306). The controlling unit 31 then judges whether or not the variable i is greater than 217 (S307). That is, the controlling unit 31 judges whether or not the judgment of the conditions of IDs "201"-"217" is completed. When the variable i is less than or equal to 217, the controlling unit 31 executes the processes of S304-S307.

When, on the other hand, the variable i is greater than 217, the controlling unit 31 judges whether or not a total sum of the variables Pa and Pb is greater than or equal to a predetermined reference point amount Pc (S308). When the total sum of the variables Pa and Pb is greater than or equal to the predetermined reference point amount Pc, the controlling unit 31 updates the intentional disconnection flag to 1 (S309). When, on the other hand, the total sum of the variables Pa and Pb is less than the predetermined reference point amount Pc, the controlling unit 31 updates the intentional disconnection flag to 0 (S310).

Here, a case where the total sum of the variables Pa and Pb becomes large is when it is speculated that the possibility that the user intentionally disconnects the power supply or communication connection of the game device 30 is high in consideration of the current game status (situation). In other words, the case where the total sum of the variables Pa and Pb becomes large is a case where, if the competition is ended partway through the competition at this point, it can be considered that the possibility that the user has intentionally disconnected the power supply or communication connection of the game device 30 is high. Thus, S308 can be considered as judging whether or not the current game status is a status where it can be speculated that the possibility that the user intentionally disconnects the power supply or communication connection of the game device 30 is high. The intentional disconnection flag indicates whether or not the current game status is a status where it can be speculated that the possibility that the user intentionally disconnects the power supply or communication connection of the game device 30 is high.

After the process of S309 or S310 is executed, the controlling unit 31 updates the game screen (S311). The controlling unit 31 generates a game screen representing a scene of the virtual three-dimensional space 50 viewed from the virtual camera 59 based on the game status data stored in the primary storage 32. The generated game screen is displayed on the display unit 37.

When it is judged in S302 that the match completion time has been reached, the controlling unit 31 updates the total competition record data and the competition history data based on the match progress data (S312). The controlling unit 31 also updates the competition start/completion flag to 0 (S313). Then, the controlling unit 31 displays the match result screen 60 on the display unit 37 (S314; refer to S105 of FIG. 4).

The competition start/completion flag is updated to 1 when the competition opponent guiding screen 45 is displayed (refer to S201 of FIG. 16). In addition, the competition start/completion flag is updated to 0 when the match result screen 60 is displayed (when the match is completed to the last) (refer to S312 of FIG. 17). Because of this, when the competition (match) is ended partway through the competition, the competition start/completion flag stored in the memory card 34 is not updated to 0 and remains at 1.

FIG. 18 is a flowchart showing a process executed by each game device 30 when the menu screen 40 is displayed (refer to S101 of FIG. 4).

As shown in FIG. 18, first, the controlling unit 31 judges whether or not the competition start/completion flag is 1 (S401). As described above, the case where the competition start/completion flag is 1 is a case where the previous competition (match) has ended partway through the competition. That is, in S401, it is judged whether or not the previous competition (match) has ended partway through the competition.

When the competition start/completion flag is 1, the controlling unit 31 adds 1 to the number of partway ends maintained in the total competition record data (S402). Then, the controlling unit 31 judges whether or not the intentional disconnection flag is 1 (S403).

Here, a case where it is judged in S403 that the intentional disconnection flag is 1 is the case where the previous competition has ended in a situation in which it is speculated that the possibility that the user intentionally disconnects the power supply or communication connection of the game device 30 is high. In other words, the case where it is judged in S403 that the intentional disconnection flag is 1 is the case where the possibility that the cause of the partway end of the previous competition is the disconnection of the power supply or communication connection of the game device 30 by the user during the competition is high.

In this case, the controlling unit 31 updates the total competition record maintained in the total competition record data (S404). That is, 1 is added to the number of competitions and to the number of losses. The controlling unit 31 also sets a time limit for competition restriction (S405). For example, the time limit for competition restriction is set to 3 days later from the current date and time. Then, the time limit for competition restriction is stored in the game card 34 (refer to FIG. 19). The controlling unit 31 also initializes the competition start/completion flag and the intentional disconnection flag to 0 (S406). Then, the controlling unit 31 displays the restricted menu screen (refer to FIG. 15) on the display unit 37 (S407).

The case where it is judged in S403 that the intentional disconnection flag is not 1, on the other hand, is a case where the previous competition has ended in a situation in which it is speculated that the possibility that the user intentionally disconnects the power supply or communication connection of the game device 30 is low. In other words, the case where it is judged in S403 that the intentional disconnection flag is not 1 is the case where the possibility that the cause of the partway end of the previous competition is disconnection of the power supply or communication connection of the game device 30 during the competition by the user is low. That is, the case where it is judged in S403 that the intentional disconnection flag is not 1 is the case where the possibility that the cause of the partway end of the previous competition is, for example, occurrence of failure in the communication network 12 is high or the case where the possibility that the cause of the partway end of the previous competition is intentional disconnection of the power supply or communication connection of the game device 30 by the competition opponent is high.

In this case, the controlling unit 31 initializes the competition start/completion flag to 0 (S408). Then, the controlling unit 31 displays the normal menu screen (refer to FIG. 5) on the display unit 37 (S409).

In addition, when it is judged in S401 that the competition start/completion flag is not 1, the controlling unit 31 judges whether or not the time limit for competition restriction is set (S410). Specifically, the controlling unit 31 judges whether or not the time limit for competition restriction is stored in the game card 34. When the time limit for competition restriction is not set, the controlling unit 31 displays the normal menu screen on the display unit 37 (S409). When, on the other hand, the time limit for competition restriction is set, the controlling unit 31 judges whether or not the time limit for competition restriction has elapsed (S411). For example, in the case where the time limit for competition restriction is set to Jul. 29, 2007 as shown in FIG. 19, the controlling unit 31 judges whether or not Jul. 29, 2007 has passed (that is, whether or not the current date is Jul. 30, 2007 or later). When the time limit for competition restriction has not elapsed, the controlling unit 31 displays the restricted menu screen on the display unit 37 (S407). When the time limit for competition restriction is set at Jul. 29, 2007 as shown in FIG. 19, for example, a message guiding the user to wait for the next competition until Jul. 30, 2007 (that is, after Jul. 29, 2007, has passed) is displayed on the restricted menu screen, as shown in FIG. 15.

When, on the other hand, the time limit for competition restriction has elapsed, the controlling unit 31 clears the time limit for competition restriction (S412). Specifically, the controlling unit 31 deletes the time limit for competition restriction stored in the game card 34. Then, the controlling unit 31 displays the normal menu screen on the display unit 37 (S409).

In the network game system 10 described above, a plurality of judgment standards for judging whether or not the user has intentionally disconnected the power supply or communication connection of the game device 30 during the competition are stored (refer to FIGS. 13 and 14). When the competition has ended partway through the competition, it is judged whether or not the user has intentionally disconnected the power supply or communication connection of the game device 30 during the competition based on the judgment result of whether or not each of the plurality of judgment standards is satisfied at the end of the competition (at the time of disconnection of the power supply or communication connection). With the network game system 10, it is possible to judge whether or not the user has intentionally disconnected the power supply or communication connection of the game device 30 during the competition.

In addition, in the network game system 10, a point is set to each of the plurality of judgment standards (refer to FIGS. 13 and 14). When the competition has ended partway through the competition, a total of points correlated to the judgment standards, among the plurality of judgment standards, that are judged as being satisfied at the time of ending of the competition (at the time of disconnection of the power supply or communication connection) is acquired. When the total of the points is greater than or equal to a predetermined reference value, it is judged that the user has intentionally disconnected the power supply or communication connection of the game device 30 during the competition. With the network game system 10, it is possible to set a weight to each of the plurality of judgment standards. As a result, it is possible to improve the precision of the judgment of whether or not the user has intentionally disconnected the power supply or communication connection of the game device 30 during the competition.

In addition, in the network game system 10, when it is judged that the user has intentionally disconnected the power supply or communication connection of the game device 30 during the competition, an alert message is displayed on the menu screen 40 (refer to FIG. 15). With the network game system 10, it is possible to promote the user to not intentionally disconnect the power supply or communication connection of the game device 30 during the competition.

Moreover, in the network game system 10, when it is judged that the user has intentionally disconnected the power supply or communication connection of the game device 30 during the competition, the user is prohibited from competing against other users until the time limit for competition restriction is passed (refer to FIG. 15). With the network game system 10, it is possible to promote the user to not intentionally disconnect the power supply or communication connection of the game device 30 during the competition.

Furthermore, in the network game system 10, when it is judged that the user has intentionally disconnected the power supply or communication connection of the game device 30 during the competition, the number of losses of the user is increased (refer to S404 of FIG. 18). Because of this, it is meaningless for the user to intentionally disconnect the power supply or communication connection of the game device 30 during the competition in hopes of avoiding the loss. With the network game system 10, it is possible to promote the user to not intentionally disconnect the power supply or communication connection of the game device 30 during the competition.

The present invention is not limited to the embodiment described above.

For example, the point amount $P_{104}$ corresponding to the condition of ID "104" may be set to vary according to the number of consecutive wins of the user. Similarly, the point amount $P_{105}$ corresponding to the condition of ID "105" may be set to vary according to the number of consecutive matches of no conceded scores.

Alternatively, for example, in S204 of FIG. 16, 1 may be added to the value of the variable Pa. In this case, the variable Pa indicates the number of conditions, among the conditions of IDs "101"-"110", satisfied by the total competition record of the user, the user team, or the competition opponent team. Alternatively, in S305 of FIG. 15, 1 may be added to the value of the variable Pb. In this case, the value of the variable Pb indicates a number of conditions, among the conditions of IDs "201"-"217", that are satisfied by the game status at that point. In this manner, the point acquiring unit 78a may acquire, as the point amount, the number of conditions, among the plurality of conditions stored in the condition storage 70c, that are judged to be satisfied. When many conditions among the plurality of conditions stored in the condition storage 70c are satisfied, it may be considered that the possibility that the user has disconnected the power supply or communication connection of the game device 30 is high. Therefore, with such a configuration also, it is possible to judge whether or not the user has intentionally disconnected the power supply or communication connection of the game device 30 during the competition.

Alternatively, for example, the values of the variables Pa and Pb may be stored in the game card 34 in place of the intentional disconnection flag. Alternatively, the total sum of the variables Pa and Pb may be stored in the game card 34. In this case, the processes of S308-S310 in the process of FIG. 17 can be omitted. In addition, in the process of S403 of FIG. 18, it is judged whether or not the total sum of the variables Pa and Pb is greater than or equal to the predetermined reference point amount Pc. When the total sum of the variables Pa and Pb is greater than or equal to the predetermined reference point amount Pc, the processes of S404-S407 are executed. When, on the other hand, the total sum of the variables Pa and Pb is less than the predetermined reference point amount Pc, the processes of S408-S409 are executed.

Alternatively, for example, judgment result data indicating the judgment result in S203 of FIG. 16 and S304 of FIG. 17 may be stored in the game card 34 in place of the intentional disconnection flag. FIG. 20 shows an example of the judgment result data. A "judgment result flag" has a value of 0 or 1. The value of "0" indicates that the condition is not satisfied and the value of "1" indicates that the condition is satisfied. In this case, in S403 of FIG. 18, the following process is executed. Specifically, first, the values of the variables Pa and Pb are acquired based on the judgment result data. Then, it is judged whether or not the total sum of the variables Pa and Pb is greater than or equal to the predetermined reference point amount Pc. When the total sum of the variables Pa and Pb is greater than or equal to the predetermined reference point amount Pc, the processes of S404-S407 are executed. When, on the other hand, the total sum of the variables Pa and Pb is less than the predetermined reference point amount Pc, the processes of S408-S409 are executed.

Alternatively, the value of the variable Pa and the game status data may be stored in the game card 34 in place of the intentional disconnection flag. In this case, the processes of S303-S310 in the process of FIG. 17 can be omitted. In this case, in S403 of FIG. 18, the following process is executed. Specifically, it is judged whether or not the conditions of IDs "201"-"217" are satisfied based on the game status data stored in the game card 34. In this case, because the game status data at the time of the end of the previous competition is stored in the game card 34, it is judged whether or not the game status at the time of the end of the previous competition satisfies the conditions of IDs "201"-"217". Then, the point amount Pb corresponding to the judgment results of the conditions of the IDs "201"-"217" is acquired. It is then judged whether or not the total sum of the variables Pa and Pb is greater than or equal to the predetermined reference point amount Pc. When the total sum of the variables Pa and Pb is greater than or equal to the predetermined reference point amount Pc, the processes of S404-S407 are executed. When, on the other hand, the total sum of the variables Pa and Pb is less than the predetermined reference point amount Pc, the processes of S408-S409 are executed.

Alternatively, for example, when it is judged in S403 of FIG. 18 that the intentional disconnection flag is 1, the team data of the user may be updated in S405 in place of setting the time limit for competition restriction. In this manner, for example, the predetermined process executing unit 78 may update the ability parameter or condition parameter of the player object 56 belonging to the user team so that the ability of the player object 56 is reduced.

Alternatively, for example, in place of the configuration where one of the game device 30 of the user and the game device 30 of the competition opponent plays the role of the game server, a configuration may be employed in which the network game management device 20 (or another server computer) plays the role of the game server. In this case, the game status data is stored in the network game management device 20, and copies of the game status data are stored in the game devices 30 of the user and of the competition opponent. In addition, the operation content executed in each game device 30 is notified to the network game management device 20 through the communication network 12. In the network game management device 20, the game status data is updated based on the operation content executed in each game device 30. Then, the game status update data indicating the update content of the game status data is transmitted to the game devices 30. In this case, the total competition record storage 70a, the game status data storage 70b, the condition storage 70c, the partway-end judging unit 74, the condition judging unit 76, and the predetermined process executing unit 78 may be realized in the network game management device 20. The predetermined process executing unit 78 may return, when the user logs in the network game system 10 or when the competition request data is received from the user, an alert message to the game device 30 of the user. Alternatively, the predetermined process executing unit 78 may be configured to not accept the log-in request data or competition request data of the user until the time limit for competition restriction is elapsed.

Alternatively, the network game provided in the network game system 10 may be a game other than the soccer game (such as, for example, a mahjong game or a fighting game). For example, when the network game provided in the network game system 10 is a fighting game of three rounds, the conditions for judging whether or not the user has disconnected the power supply or communication connection of the game device 30 during the competition may include, for example, a condition for judging whether or not a stamina parameter of the character of the competition opponent is greater than the stamina parameter of the character of the user, and a condition for judging whether or not the number of wins of the competition opponent is greater than the number of wins of the user. Alternatively, for example, the network game provided in the network game system 10 may be a game in which three or more users participate.

The invention claimed is:

1. A network game system which executes a network game in which a plurality of users compete through a communication network, the network game system comprising:
   game status data storage means for storing game status data which indicates a game status of the network game;
   condition storage means for storing a plurality of game status conditions related to the game status;
   partway-end judging means for judging whether or not the competition between the plurality of users has ended partway through the competition;
   numerical value acquiring means for acquiring a base numerical value for each of the plurality of game status conditions, and calculating a numerical value by executing a predetermined calculation process based on the base numerical value of each of the game status condition; wherein the base numerical value for each of the plurality of game status conditions is based on whether the game status at a time which the competition has ended partway through the competition satisfies the respective game status condition;

judging means for judging, after judging that the competition has ended partway through the competition, a possibility that a user among the plurality of users has intentionally ended the competition partway through the competition based on a result of a comparison between the numerical value and a predetermined reference value; and predetermined process executing means for executing, in a case where the competition has ended partway through the competition, a predetermined process based on a judgment result of the judging of the possibility that the user among the plurality of users has intentionally ended the competition partway through the competition.

2. The network game system according to claim 1, wherein the numerical value acquiring means calculates a total numerical value by adding the base numerical value of each of the game status condition, the network game system further comprises comparing means for comparing the total numerical value with the predetermined reference value, and determining whether the total numerical value is greater than or equal to the predetermined reference value;

the predetermined process executing means executes the predetermined process based on the comparison result by the comparing means in the case where the competition has ended partway through the competition.

3. The network game system according to claim 2, further comprising:

base numerical value storage means for storing the base numerical value in correspondence with each of the plurality of game status conditions stored in the condition storage means, wherein the numerical value acquiring means acquires the numerical value by executing a predetermined calculation process based on the base numerical value stored in correspondence with the game status condition satisfied by the game status among the plurality of game status conditions stored in the condition storage means.

4. The network game system according to claim 2, further comprises condition judging means for judging, in a case where the game status data stored in the game status data storage means is updated, whether or not the game status indicated by the game status data satisfies each of the plurality of game status conditions stored in the condition storage means, wherein the numerical value acquiring means acquires, in a case where the judgment by the condition judging means is executed, the numerical value corresponding to the judgment result, the comparing means compares, in a case where the numerical value acquiring means acquires the numerical value, the numerical value with the predetermined reference value, and stores the comparison result in a non-volatile storage means, and the predetermined process executing means executes the predetermined process based on the comparison result stored in the non-volatile storage means in the case where the competition has ended partway through the competition.

5. The network game system according to claim 2, further comprises condition judging means for judging, in a case where the game status data stored in the game status data storage means is updated, whether or not the game status indicated by the game status data satisfies each of the plurality of game status conditions stored in the condition storage means, wherein the numerical value acquiring means acquires, in a case where the judgment by the condition judging means is executed, the numerical value corresponding to the judgment result, and stores the numerical value in a non-volatile storage means, and the comparing means compares, in the case where the competition has ended partway through the competition, the numerical value stored in the non-volatile storage means with the predetermined reference value.

6. The network game system according to claim 2, further comprises condition judging means for judging, in a case where the game status data stored in the game status data storage means is updated, whether or not the game status indicated by the game status data satisfies each of the plurality of game status conditions stored in the condition storage means, and stores the judgment result in a non-volatile storage means, and wherein the numerical value acquiring means acquires, in the case where the competition has ended partway through the competition, the numerical value corresponding to the judgment result stored in the non-volatile storage means.

7. The network game system according to claim 2, wherein the game status data storage means is a non-volatile storage means, and the network game system further comprises condition judging means for judging, in the case where the competition has ended partway through the competition, whether or not the game status indicated by the game status data stored in the game status data storage means satisfies each of the plurality of game status conditions stored in the condition storage means.

8. The network game system according to claim 7 wherein the predetermined process includes at least one of a process to output a predetermined message to at least one of the plurality of users, and a process to restrict competition by at least one of the plurality of users.

9. The network game system according to claim 7, further comprising total competition record storage means for storing a total competition record of each of the plurality of users, wherein the predetermined process includes a process to update the total competition record of at least one of the plurality of users.

10. A method of controlling a network game system which executes a network game in which a plurality of users compete through a communication network, the method comprising:

a reading operation in which stored content of game status data storage storing game status data which indicates a game status of the network game is read;

a reading operation in which stored content of condition storage storing a plurality of game status conditions related to the game status is read;

a partway-end judging operation in which it is judged whether or not the competition between the plurality of users has ended partway through the competition;

a numerical value acquiring operation in which a base numerical value for each of the plurality of game status conditions is acquired, and a numerical value is calculated by executing a predetermined calculation process based on the base numerical value of each of the game status condition; wherein the base numerical value for each of the plurality of game status conditions is based on whether the game status at a time which the competition has ended partway through the competition satisfies the respective game status condition;

a condition judging operation, implemented by a processor, in which it is judged, after judging that the competition has ended partway through the competition, a possibility that a user among the plurality of users has intentionally ended the competition partway through the competition, based on a result of a comparison between the numerical value and a predetermined reference value; and a predetermined process executing operation in which a predetermined process is executed, in a case where the competition has ended partway through the competition, based on a judgment result of the judging of the possibility that the user among the plurality of users has intentionally ended the competition partway through the competition, the predetermined process comprising restricting competition by the user among the plurality of users.

11. A non-transitory computer-readable information storage medium which stores a program for causing a computer to function as a network game system which executes a network game in which a plurality of users compete through a communication network, and perform a method comprising:

reading stored content of a game status data storage storing game status data which indicates a game status of the network game;

reading stored content of a condition storage storing a plurality of game status conditions related to the game status;

judging whether or not the competition between the plurality of users has ended partway through the competition;

acquiring a base numerical value for each of the plurality of game status conditions, wherein the base numerical value for each of the plurality of game status conditions is based on whether the game status at a time which the competition has ended partway through the competition satisfies the respective game status condition;

calculating a numerical value by executing a predetermined calculation process based on the base numerical value of each of the game status condition;

judging, after judging that the competition has ended partway through the competition, a possibility that a user among the plurality of users has intentionally ended the competition partway through the competition, based on a result of a comparison between the numerical value and a predetermined reference value; and executing, in a case where the competition has ended partway through the competition, a predetermined process based on a judgment result of the judging of the possibility that the user among the plurality of users has intentionally ended the competition partway through the competition, the predetermined process comprising restricting competition by the user among the plurality of users.

12. A game device which is included as one of a plurality of game devices in a network game system which includes the plurality of game devices and which executes a network game in which users of the plurality of game devices compete through a communication network, the game device comprising:

game status data storage means for storing game status data which indicates a game status of the network game;

condition storage means for storing a plurality of game status conditions related to the game status;

partway-end judging means for judging whether or not the competition between the plurality of users has ended partway through the competition;

numerical value acquiring means for acquiring a base numerical value for each of the plurality of game status conditions, and calculating a numerical value by executing a predetermined calculation process based on the base numerical value of each of the game status condition; wherein the base numerical value for each of the plurality of game status conditions is based on whether the game status at a time which the competition has ended partway through the competition satisfies the respective game status condition;

condition judging means for judging, after judging that the competition has ended partway through the competition, a possibility that a user among the plurality of users has intentionally ended the competition partway through the competition based on a result of a comparison between the numerical value and a predetermined reference value; and predetermined process executing means for executing, in a case where the competition has ended partway through the competition, a predetermined process based on a judgment result of the judging of the possibility that the user among the plurality of users has intentionally ended the competition partway through the competition.

13. A method of controlling a game device which is included as one of a plurality of game devices in a network game system which includes the plurality of game devices and which executes a network game in which users of the plurality of game devices compete through a communication network, the method comprising:

a reading operation in which stored content of game status data storage storing game status data which indicates a game status of the network game is read;

a reading operation in which stored content of condition storage storing a plurality of game status conditions related to the game status is read;

a partway-end judging operation in which it is judged whether or not the competition between the plurality of users has ended partway through the competition;

a numerical value acquiring operation in which a base numerical value for each of the plurality of game status conditions is acquired, and a numerical value is calculated by executing a predetermined calculation process based on the base numerical value of each of the game status condition; wherein the base numerical value for each of the plurality of game status conditions is based on whether the game status at a time which the competition has ended partway through the competition satisfies the respective game status condition;

a condition judging operation, implemented by a processor, in which it is judged, after judging that the competition has ended partway through the competition, a possibility that a user among the plurality of users has intentionally ended the competition partway through the competition, based on a result of a comparison between the numerical value and a predetermined reference value; and a predetermined process executing operation in which a predetermined process is executed, in a case where the competition has ended partway through the competition, based on a judgment result of the judging of the possibility that the user among the plurality of users has intentionally ended the competition partway through the competition, the predetermined process comprising restricting competition by the user among the plurality of users.

14. A non-transitory computer-readable information storage medium which stores a program for causing a computer to function as a game device which is included as one of a plurality of game devices in a network game system which includes the plurality of game devices and which executes a network game in which users of the plurality of game devices compete through a communication network, and perform a method comprising:
reading stored content of a game status data storage storing game status data which indicates a game status of the network game;
reading stored content of a condition storage storing a plurality of game status conditions related to the game status;
judging whether or not the competition between the plurality of users has ended partway through the competition;
acquiring a base numerical value for each of the plurality of game status conditions, wherein the base numerical value for each of the plurality of game status conditions is based on whether the game status at a time which the competition has ended partway through the competition satisfies the respective game status condition;
calculating a numerical value by executing a predetermined calculation process based on the base numerical value of each of the game status condition;
judging, after judging that the competition has ended partway through the competition, a possibility that a user among the plurality of users has intentionally ended the competition partway through the competition, based on a result of a comparison between the total numerical value and a predetermined reference value; and
executing, in a case where the competition has ended partway through the competition, a predetermined process based on a judgment result of the judging of the possibility that the user among the plurality of users has intentionally ended the competition partway through the competition, the predetermined process comprising restricting competition by the user among the plurality of users.

15. A network game system which executes a network game in which a plurality of users compete through a communication network, the network game system comprising:
game status data storage device storing game status data which indicates a game status of the network game;
condition storage device storing a plurality of game status conditions related to the game status; and
a processor configured to:
determine whether or not the competition between the plurality of users has ended partway through the competition;
acquire a base numerical value for each of the plurality of game status conditions, wherein the base numerical value for each of the plurality of game status conditions is based on whether the game status at a time which the competition has ended partway through the competition satisfies the respective game status condition;
calculate a numerical value by executing a predetermined calculation process based on the base numerical value of each of the game status condition;
determine, if the competition has ended partway through the competition, a possibility that a user among the plurality of users has intentionally ended the competition partway through the competition based on a result of a comparison between the numerical value and a predetermined reference value; and
execute, in a case where the competition has ended partway through the competition, a predetermined process based on a judgment result of the judging of the possibility that the user among the plurality of users has intentionally ended the competition partway through the competition.

16. A game device which is included as one of a plurality of game devices in a network game system which includes the plurality of game devices and which executes a network game in which users of the plurality of game devices compete through a communication network, the game device comprising:
game status data storage device storing game status data which indicates a game status of the network game;
condition storage device storing a plurality of game status conditions related to the game status; and
a processor configured to:
determine whether or not the competition between the plurality of users has ended partway through the competition;
acquire a base numerical value for each of the plurality of game status conditions, wherein the base numerical value for each of the plurality of game status conditions is based on whether the game status at a time which the competition has ended partway through the competition satisfies the respective game status condition;
calculate a numerical value by executing a predetermined calculation process based on the base numerical value of each of the game status condition;
determine, if the competition has ended partway through the competition, a possibility that a user among the plurality of users has intentionally ended the competition partway through the competition based on a result of a comparison between the numerical value and a predetermined reference value; and
execute, in a case where the competition has ended partway through the competition, a predetermined process based on a judgment result of the judging of the possibility that user among the plurality of users has intentionally ended the competition partway through the competition.

17. The network game system according to claim 1, wherein when the numerical value is greater than or equal to the predetermined reference value, the condition judging means judges that the user has intentionally ended the competition partway through the competition.

18. The game device according to claim 12, wherein when the numerical value is greater than or equal to the predetermined reference value, the condition judging means judges that the user has intentionally ended the competition partway through the competition.

19. The network game system according to claim 1, wherein the plurality of game status conditions correspond to the user's performance in the competition.

20. The network game system according to claim 1, wherein
each of the plurality of game status conditions indicates an example of game status where there is a possibility that a user among the plurality of users intentionally ends the competition partway through the competition, and
each of the plurality of game status conditions is a condition for judging whether or not the game status at a time which the competition has ended partway through the competition corresponds to the game status where there is a possibility that a user among the plurality of users intentionally ends the competition partway through the competition.

* * * * *